(12) United States Patent
Landers

(10) Patent No.: US 9,836,763 B2
(45) Date of Patent: Dec. 5, 2017

(54) PRINTING, DISPLAYING, AND ETCHING ADVERTISEMENTS ON VARIOUS MEDIA

(71) Applicant: Neal Harley Landers, Ball Ground, GA (US)

(72) Inventor: Neal Harley Landers, Ball Ground, GA (US)

(*) Notice: Subject to any disclaimer, the term of this patent is extended or adjusted under 35 U.S.C. 154(b) by 0 days.

(21) Appl. No.: 14/790,712

(22) Filed: Jul. 2, 2015

(65) Prior Publication Data
US 2015/0363829 A1    Dec. 17, 2015

Related U.S. Application Data

(63) Continuation-in-part of application No. 13/667,711, filed on Nov. 2, 2012, now Pat. No. 9,076,161.

(51) Int. Cl.
*G06F 17/00* (2006.01)
*G06Q 30/02* (2012.01)

(52) U.S. Cl.
CPC ......... *G06Q 30/0264* (2013.01); *G06Q 30/02* (2013.01); *G06Q 30/0241* (2013.01); *G06Q 30/0255* (2013.01); *G06Q 30/0259* (2013.01); *G06Q 30/0265* (2013.01)

(58) Field of Classification Search
CPC .................................................... G06C 30/02
USPC ....................................... 235/375; 705/14.49
See application file for complete search history.

(56) References Cited

U.S. PATENT DOCUMENTS

| | | | | |
|---|---|---|---|---|
| 2001/0034775 A1* | 10/2001 | Minowa | ............... | G06Q 20/387 709/218 |
| 2002/0059100 A1* | 5/2002 | Shore | ..................... | G06Q 30/02 705/14.23 |
| 2010/0067039 A1* | 3/2010 | Williams | ............... | G06Q 30/02 358/1.15 |

* cited by examiner

*Primary Examiner* — Jamara Franklin
(74) *Attorney, Agent, or Firm* — Glenn W. Brown

(57) ABSTRACT

Advertisement systems and methods for distributing advertisements are provided. An advertising system according to one embodiment includes an advertisement server configured to manage the ordering and printing of advertisements at predetermined locations and at predetermined times. The advertising system also includes a plurality of printing devices operating at the predetermined locations, each printing device configured to print an advertisement on an item associated with a purchase. A network is configured to enable communication between the advertisement server and the plurality of printing devices. The printing devices are configured to print the advertisements according to the plurality of predetermined times based on when at least one advertiser intends for the advertisements to be printed. Other implementations of advertisement systems include three-dimensional printing or etching of advertisements and displaying advertisements on electronic devices. Advertising may also be based on weather conditions, traffic conditions, or other conditions.

26 Claims, 10 Drawing Sheets

PRINTING, DISPLAYING, AND ETCHING ADVERTISEMENTS ON VARIOUS MEDIA

CROSS-REFERENCE TO RELATED APPLICATIONS

This application is a continuation-in-part of U.S. patent application Ser. No. 13/667,711, filed Nov. 2, 2012, titled "System for Printing an Advertisement on a Ticket," which claims the benefit under 35 U.S.C. §119 of U.S. Provisional Application No. 61/555,842, filed on Nov. 4, 2011, the entire disclosures of which are incorporated by reference herein.

TECHNICAL FIELD

The present disclosure generally relates to advertising, and more particularly relates to printing, displaying, and/or etching advertisements on various types of media.

BACKGROUND

For years, businesses have created advertisements to endorse their products, brands, etc. Normally, these advertisements can be presented to an audience in a number of ways. For example, some advertisements may be presented in printed form and published in newspapers, magazines, flyers, etc. Other advertisements may be presented in audible form, such as those communicated over the radio. Still others may include both visual and audible elements, such as those that are commonly presented on television or on a computer. Regarding printed advertisements, some businesses, such as restaurants, may choose to advertise by printing coupons. These coupons can be combined with other coupons from other businesses in coupon books, printed in newspapers and magazines, or printed on individual cards or flyers. Despite the numerous ways that a business may advertise, businesses are continually looking for new ways to distribute advertisements and coupons to their audience.

Also, businesses usually attempt to present their advertisements in a way that will reach the type of audience that they intend to target. For example, businesses may wish to purchase television advertisement slots to show commercials to an audience that may be more likely to buy their products or patronize their establishments. The advertisements can then more sharply focus on viewers who might have more of a tendency to watch the associated television programs. This can be done to expose the intended audience with their advertisements. It would be desirable for a business, however, to have greater flexibility in advertising to be able to target their audience so that advertisements can reach the people that may be more likely to use their products or visit their establishments

SUMMARY

The present disclosure describes various implementations related to advertising systems and methods for ordering, organizing, managing, creating, and distributing advertisements. Accordingly, in one embodiment, an advertising system includes an advertisement server configured to manage the printing of advertisements at a plurality of predetermined locations and at a plurality of predetermined times. The advertising system also includes a plurality of printing devices operating at the plurality of predetermined locations, each printing device configured to print an advertisement on an item associated with a purchase. A network is configured to enable communication between the advertisement server and the plurality of printing devices. The printing devices are configured to print the advertisements according to the plurality of predetermined times based on when at least one advertiser intends for the advertisements to be printed. Other implementations of advertisement systems include three-dimensional printing or etching of advertisements and displaying advertisements on electronic devices. Advertising may also be based on weather conditions, traffic conditions, or other conditions.

BRIEF DESCRIPTION OF THE DRAWINGS

The features illustrated in the following figures are intended to emphasize the general principles of the present disclosure and are not necessarily drawn to scale. Consistent reference characters are used throughout the figures to designate corresponding features.

DETAILED DESCRIPTION

The present disclosure describes systems and methods for creating an advertisement strategy, which may include not only the advertisement itself, but also time and location information for specifying when and where the advertisement is to be run. However, rather than using conventional means of presenting an advertisement to an audience, the advertisements according to various implementations of the present disclosure may be printed on various types of media, displayed on various types of electronic devices, and/or broadcast over wireless communication channels. With the embodiments of the present disclosure, an advertiser or advertiser's representative can easily create and/or upload an advertisement to an advertisement server disclosed herein. Approved advertisements can be immediately printed, displayed, and/or broadcast to a selected audience without additional intermediate steps typically involved in the field of advertising.

Printing Advertisements on Tickets

For example, advertisements may be printed on any suitable type of ticket, such as a movie ticket, sporting event ticket, concert ticket, theater ticket, lottery ticket, rapid transit ticket, train ticket, airline ticket, or ticket for other events or purposes. In particular, the implementations disclosed herein may be combined with a lottery system, whereas an advertisement can be printed on a lottery ticket that is distributed to a person purchasing the lottery ticket. In particular, lottery tickets (and other types of tickets) represent a unique purchase in that they are printed for an individual at a known location and time. Unlike coupons that might normally get thrown away or ignored, the lottery ticket is usually held by the purchaser and read multiple times during the short lifespan of the ticket.

Using the implementations described in the present disclosure, an advertiser can create one or more advertisement strategies using a process involving online systems. The advertisements can then be distributed to ticket printing devices to be printed for individuals who wish to purchase some type of ticket. The regular ticket information is printed on the ticket along with the advertisement, and the ticket can be handed to the customer. With the example of lottery tickets, the advertisement can be printed on the same ticket that includes the lottery numbers. By allowing the advertisers to choose where the advertisements are printed, the advertisements can be distributed to people who might live or work in a specific area (e.g., near a particular restaurant). For example, lottery ticket printing devices, sometimes referred to as point-of-sale (POS) lottery machines, are usually housed in known, fixed locations, such as in convenience stores, gas stations, grocery stores, restaurants, bars, and other venues. Also, ads can be delivered to smart phone or other mobile devices where the location, approximate or specific, can be determined by GPS or other location positioning means.

Figure 1:
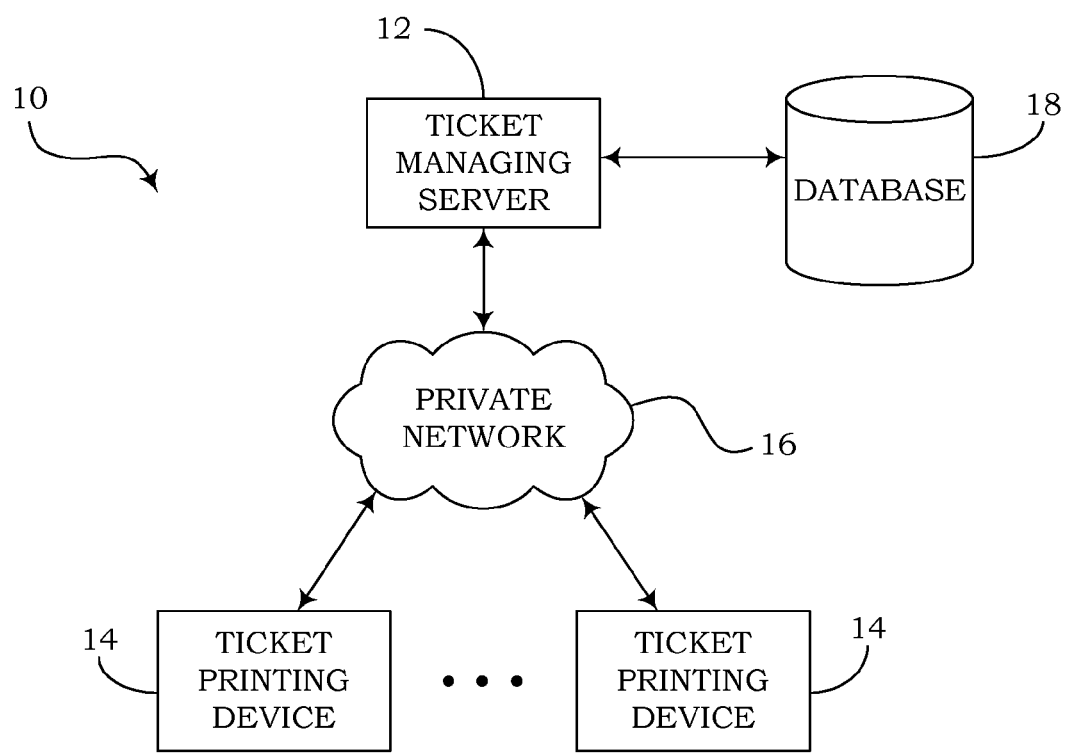
FIG. 1 is a block diagram showing a conventional ticket distribution system.

FIG. 1 is a block diagram illustrating a conventional ticket distribution system 10. As shown, the ticket distribution system 10 includes a ticket managing server 12 and a plurality of ticket printing devices 14, where the ticket managing server 12 communicates with the ticket printing devices 14 via a private network 16. The ticket managing server 12 may store ticket information in a database 18. In some embodiments, the ticket printing devices 14 do not communicate with each other, but only communicate with the ticket managing server 12. The ticket distribution system 10 may be a closed system that would normally not operate over the Internet. For security purposes, the private network 16 is normally inaccessible to devices outside the ticket distribution system 10.

In some embodiments, the ticket distribution system 10 is a lottery system that manages and controls the distribution and printing of lottery tickets. The ticket managing server 12 may include one or more computers for a state lottery system or may be the main computer(s) for a lottery system that extends into multiple states, such as the Mega Millions and Power Ball lottery systems. The ticket printing devices 14 may represent the point-of sale (POS) lottery machines where a customer can purchase a lottery ticket. In other embodiments, the ticket distribution system 10 may be related to a system for distributing and printing other types of tickets, such as movie tickets, concert tickets, airline tickets, etc.

When a customer wishes to purchase a lottery ticket (e.g., a ticket for Mega Millions, Power Ball, Daily Double, Pick 3, Pick 4, Win For Life, or other lottery game), the ticket printing device 14 prints out the lottery ticket with a certain number of lottery numbers. These lottery numbers may be selected by the customer or may be randomly selected. When random numbers are selected, the ticket distribution system 10 may include two different scenarios for picking the random numbers. In one embodiment, the ticket managing server 12 may be informed by a particular ticket printing device 14 that numbers are to be selected and will then pick random numbers (e.g., using a random number generator) and supply these numbers to the particular ticket printing device 14. In another embodiment, the ticket printing device 14 itself may be configured to randomly pick numbers if the device is equipped with a random number generator. Once the numbers are picked, the ticket printing device 14 can print the lottery ticket.

When the ticket printing device 14 selects the random numbers (or if the numbers are selected by the customer), the lottery numbers are communicated to the ticket managing server 12 in order that the ticket managing server 12 can store information about the lottery ticket sold, such as the lottery numbers on the ticket, the time and date when the ticket was sold, and the location where the ticket was sold (i.e., an establishment that houses the ticket printing device 14). If the ticket managing server 12 picks the random numbers, the ticket managing server 12 stores the same information about the lottery ticket sold (i.e., the lottery numbers, time, date, and location information). This information can be stored in the database 18.

According to some reports, the sale of lottery tickets in the United States exceeded $50 billion in 2011, which is about $200 per capita. Also, there were over 200,000 lottery ticket printing devices 14 operating in the U.S. in 2011, and the number of devices continues to rise. From this information, it can be determined that a typical ticket printing device 14 may print over 200,000 tickets per year, or more than about 20 per hour.

FIGS. 2A through 2D are block diagrams illustrating various embodiments of advertisement systems according to various implementations of the present disclosure. The advertisement systems of FIGS. 2A-2D include advertisement distribution systems combined with ticket distribution systems. The advertisement distribution systems can be incorporated with any type of ticket distribution system that includes printing facilities located in specific locations where an advertisement can be printed on any suitable medium. In some embodiments, the ticket distribution systems are lottery systems. The ticket printing devices 34 in these embodiments may be configured to print any type of tickets, depending on the type of system in which they are deployed. For example, in a sporting event ticket printing system, the ticket printing devices 34 may be configured to print tickets for a particular sporting event. The printed tickets may include lottery tickets, movie tickets, concert tickets, sporting event tickets, rapid transit tickets, airline tickets, or other types of tickets. In some embodiments, the ticket printing devices 34 may alternatively be configured to print other types of items (e.g., pamphlets, brochures, flyers, newspapers, magazines, etc.).

The advertisement systems of FIGS. 2A-2D may represent a system that is configured for a single state (e.g., Georgia), multiple states, a country, multiple countries, or other geographical or political regions. For example, when configured with a lottery system, one advertisement system may be located in each state, and communication may take place between systems of other states, particularly for interstate lottery games (e.g., Mega Millions, Power Ball, etc.).

It should be noted that each advertisement system of FIGS. 2A-2D may include security measures that are incorporated throughout the respective system. Thus, when an advertisement is created, security elements are added. Also, when advertisements are distributed to the ticket printing devices 34, the security elements can be verified to ensure that the advertisements are authentic. Furthermore, when an advertisement is printed, the ticket printing devices 34 may also check the security elements. The security elements may include encoding/decoding protocols, encryption/decryption protocols, or other protocols that are known by some or all of the components (e.g., the ticket managing server 32, ticket printing devices 34, and advertisement managing system 40) of the systems of FIG. 2. In some embodiments, the components of the systems may utilize code characters, passwords, or other codes that are configured to change in a certain way. For example, a code number may increase by a certain value on a regular basis (e.g., every day). Also, the components of the systems may be configured to use and check for certain advertisement characteristics to ensure security. For example, these advertisement characteristics may include a specific size of an image of the advertisement, a specific type of file, a file naming convention, a specific number of dots per inch (dpi) for the advertisements, or other characteristics.

The advertisement systems of FIGS. 2A-2D may allow an advertiser to promote local events, drive business to a particular store, promote brand affinity with local organizations (e.g., local sports teams), promote special events (e.g., sporting events, fairs, festivals, etc.), and even raise money for charity. The advertisement systems allow advertisers to easily target specific areas. Also, advertisers can run advertisements at specific times, depending on local events or other occurrences that may have a limited duration (e.g., a fair or circus in a local area, etc.).

As opposed to a system that includes an advertisement for one advertiser that is printed on all tickets in a batch, the advertisement systems of the present disclosure enable multiple advertisers to advertise as many advertisements as they wish and have the advertisements targeted at only certain locations. In this regard, the present disclosure provides a variable system that can select from among a plurality of advertisements, depending on various parameters. Also, the advertisements can be printed on a ticket, as opposed to other media, which may normally be maintained more carefully by its holder than a typical coupon. Therefore, it may be more likely that the holder will view the advertisement more often.

Figure 2A:
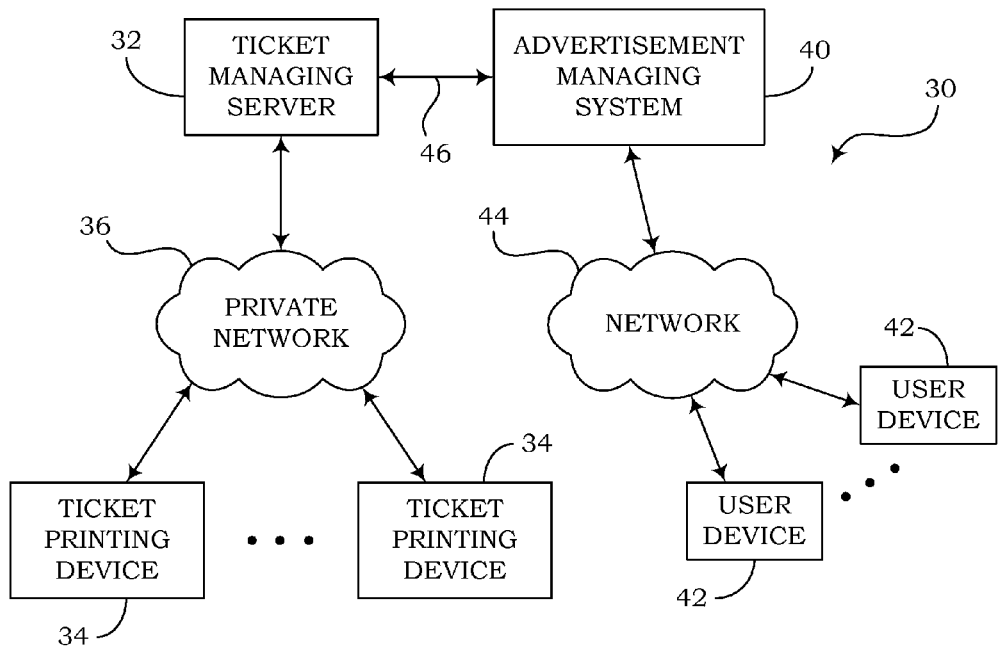
FIGS. 2A-2D are block diagrams showing advertisement systems according to various implementations of the present disclosure.

FIG. 2A shows an embodiment of an advertisement system 30. In this embodiment, the advertisement system 30 includes a ticket managing server 32, ticket printing devices 34, a private network 36 interconnecting the ticket managing server 32 with the ticket printing devices 34, an advertisement managing system 40, user devices 42, and a second network 44 interconnecting the advertisement managing system 40 with the user devices 42. Although not shown, the ticket printing devices 34 may, according to some implementations, be connected to the network 44. As shown, the private network 36 and second network 44 are separate from each other.

The advertisement system 30 may be incorporated into an already existing ticket distribution system that includes, for example, the ticket managing server 32, ticket printing devices 34, and private network 36. These elements may be similar to the corresponding elements shown in FIG. 1. However, according to the embodiments described in the present disclosure, the ticket distribution system portion of the advertisement system 30 not only prints tickets and records information about the tickets, but also may be configured to alter the tickets, such as by creating a space or place holder that allows one or more advertisements to also be printed on the ticket. Advertisements that are created by the advertisement managing system 40 may be stored in a database or other memory device. According to various embodiments, one or more databases or memory devices may be connected to the ticket managing server 32, the advertisement managing system 40, and/or the ticket printing devices 34. Then, when a ticket is to be printed, an advertisement is retrieved from the database and printed along with the ticket information.

Regarding the aspect of creating an advertisement or planning an advertisement strategy, the advertisement system 30 uses the advertisement managing system 40. The advertisement managing system 40 is configured to communicate with one or more user devices 42 via the network 44. According to some embodiments, the network 44 may be a local area network (LAN) and/or a wide area network (WAN), such as the Internet. The network 44 may include wired and/or wireless components. In some embodiments, the network 44 may be omitted altogether such that communication between the user devices 42 and the advertisement managing system 40 involves physically delivering a data storage device (e.g., CD, flash drive, or other portable storage device) from one device to the other.

When the network 44 is configured for local communication, the user devices 42 may represent terminals used by people who are associated with the advertisement managing system 40 for inputting advertisement orders for various clients. In other embodiments, the user devices 42 may represent computers or other processing devices connected to the advertisement managing system 40 via the Internet, where these user devices 42 are used by advertisers who wish to create an advertisement online. In this respect, the advertisement managing system 40 may include a web server for providing a website where users can create one or more advertisements and/or plan advertisement strategies or campaigns.

The ticket distribution portion and advertisement portion are combined in the embodiment of FIG. 2A by a bridge 46, which may include a permanent or removable conductor connecting the ticket managing server 32 with the advertisement managing system 40. The bridge 46 may include USB connections, a dedicated conductor, a Secure Shell (SSH) connection, or other suitable connectivity between the various servers. The servers may be synchronized using an SSH protocol. In some embodiments, the bridge 46 may be replaced with an indirect connection, such as providing information on a memory device (e.g., CD, flash drive, etc.) and physically transferring information from one device to the other. In some embodiments, the ticket managing server 32 and advertisement managing system 40 may communicate using a third network on which only these two systems communicate.

Regardless of the manner in which the devices are connected, the advertisement managing system 40 communicates advertisements and associated information to the ticket managing server 32 to enable printing of the advertisements on tickets according to specific instructions. Also, the ticket managing server 32 communicates information back to the advertisement managing system 40 providing verification that all or some of the advertisements to be printed have indeed been printed. The verification information may include advertisement information (which advertisement(s) were printed), the time and date when the advertisement(s) were printed on the tickets, when the ticket was handed to a customer, and the locations where the advertisement(s) were printed. Ticket information does not normally need to be supplied to the advertisement portion of the advertisement system 30. Therefore, the bridge 46 may provide secure communication and may prevent the user devices 42 or other components of the advertising portion of the system 30 from communicating with or hacking into the ticket managing server 32.

Communication between the ticket distribution portion of the advertisement system 30 and the advertisement portion of the advertisement system 30 may be made on a limited basis. For example, advertisements may be communicated to the ticket portion on an hourly basis, daily basis, weekly basis, or other suitable time intervals. Also, confirmation of the printing of advertisements may be communicated back to the advertisement portion on an hourly, daily, weekly, or other timely basis. It should be noted that some or all of the features described herein with respect to FIG. 2A may also be applicable to FIGS. 2B-2D as well.

Figure 2B:
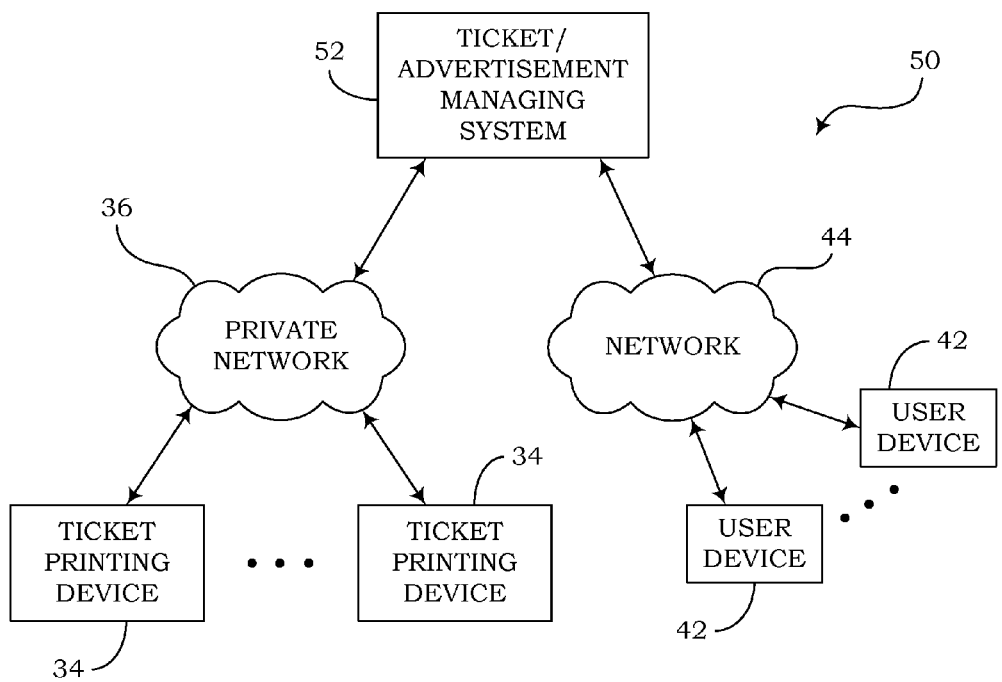

FIG. 2B is a second embodiment of an advertisement system 50. The advertisement system 50 in this embodiment is similar to the system 30 of FIG. 2A, except that the ticket managing server 32 and advertisement managing system 40 are combined into one server or computer system, labeled as a ticket/advertisement managing system 52. In some embodiments, the ticket managing server 32 shown in FIG. 2A may be modified to include the features of the advertisement managing system 40 to provide the ticket/advertisement managing system 52. The modified ticket server in this respect may include a second interface device to allow communication on the second network 44. According to some embodiments, the ticket/advertisement managing system 52 may include a switch (e.g., electrical, mechanical, or electromechanical switch) that enables the system 52 to operate as a ticket managing server at some times and to operate as an advertisement managing system at other times. The switch can also be used to switch between operating over the private network 36 at some times while operating on the second network 44 at other times.

Figure 2C:
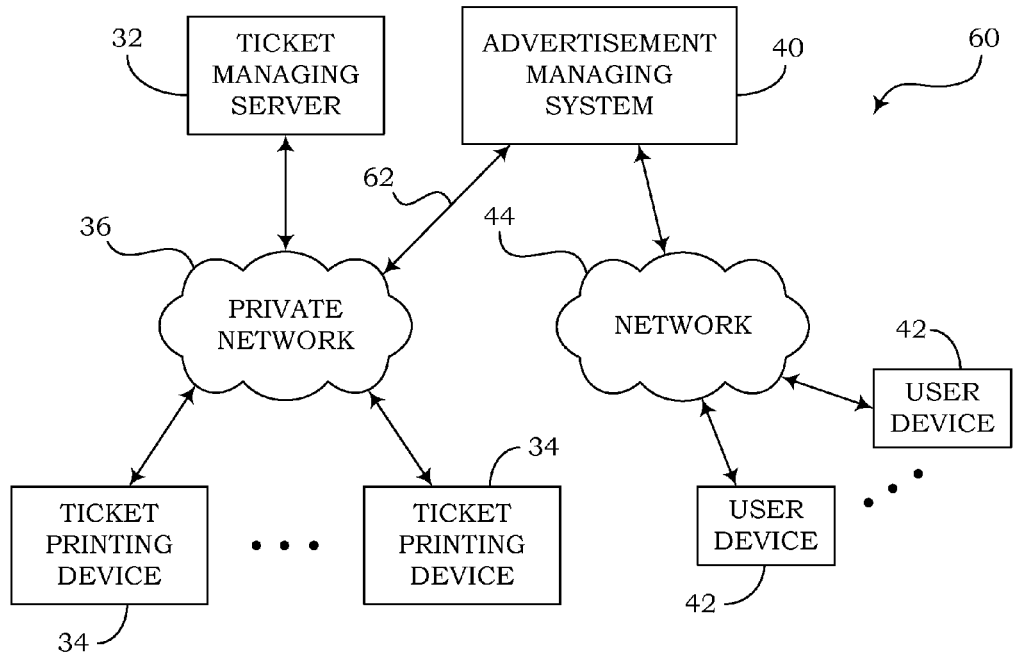

FIG. 2C shows another embodiment of an advertisement system 60. In this embodiment, the bridge 46 shown in FIG. 2A is omitted and instead the advertisement managing system 40 is configured to connect to the private network 36 via a secure connector 62. The secure connector 62 may limit the operations of the advertisement managing system 40 within the private network 36. As such, the advertisement managing system 40 may provide advertisements to the ticket managing server 32 and/or ticket printing devices 34 and receive confirmation from the ticket printing devices 34 or ticket managing server 32 as to when and where the advertisements are printed.

Figure 2D:
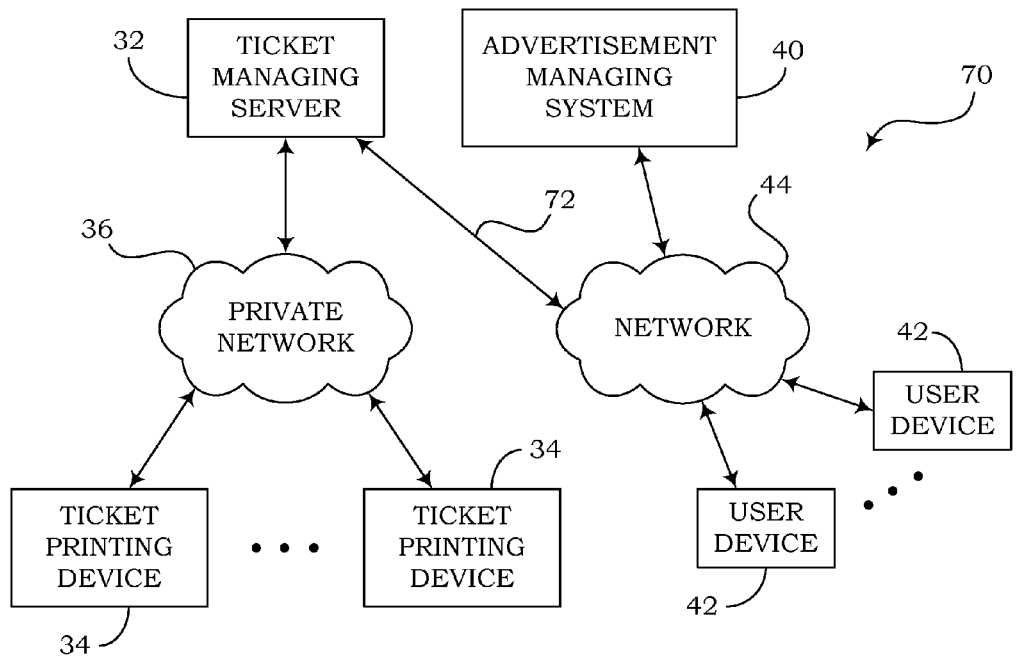

FIG. 2D shows another embodiment of an advertisement system 70. In this embodiment, the bridge 46 shown in FIG. 2A is omitted and instead the ticket managing server 32 is configured to connect to the network 44 via a secure connector 72. The secure connector 72 may limit or restrict the access that the components on the network 44 may have with the ticket managing server 32. The ticket managing server 32 may retrieve advertisements from the advertisement managing system 40 via the network 44 and may provide confirmation information to the advertisement managing system 40, or even directly to the user devices 42. The confirmation information may be designed to confirm which advertisements have been printed, the time and date of printing, and the locations where they were printed.

Figure 3A:
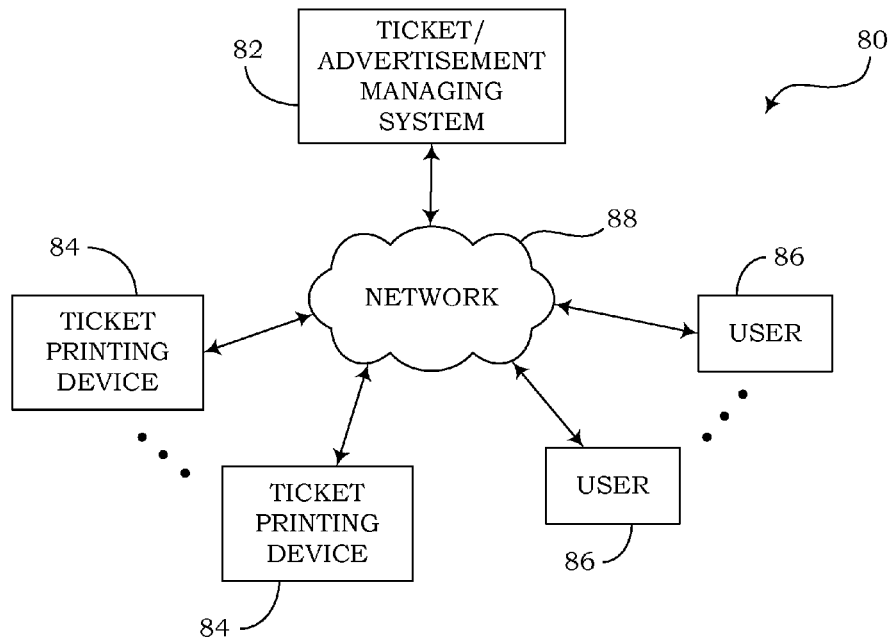
FIGS. 3A and 3B are block diagrams showing more advertisement systems according to various implementations of the present disclosure.
Figure 3B:
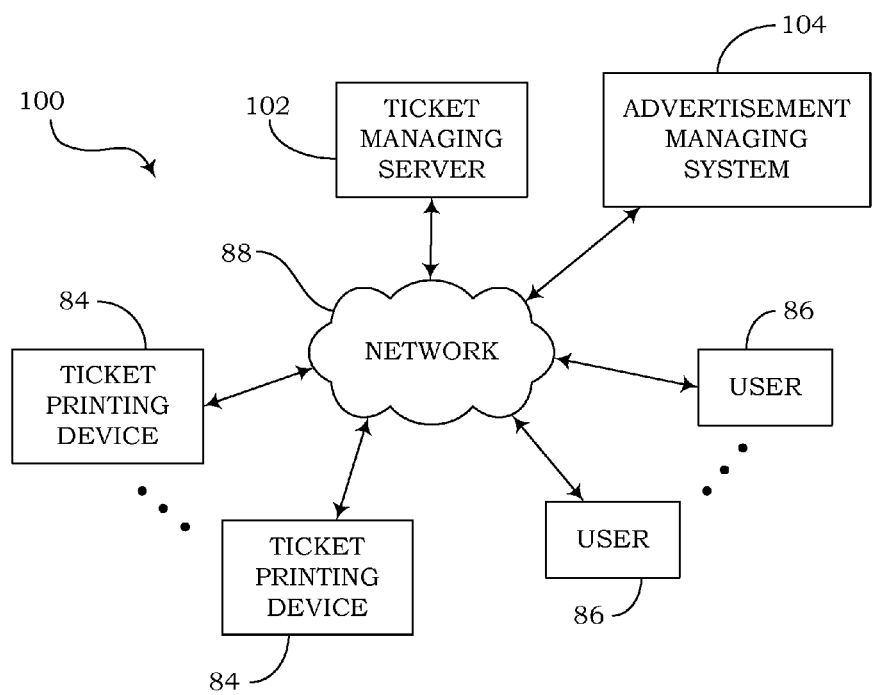

FIGS. 3A and 3B are block diagrams showing other embodiments of advertising systems according to the present disclosure. In these embodiments, in contrast to the embodiments of FIGS. 2A-2D that operate over two separate networks, the ticket distribution portions and advertisement portions exist together and operate over a common network. For example, the network in these embodiments may include a secure network. Since it may be much more expensive to operate on and maintain the private network 36, costs can be reduced by operating on a single network. Therefore, the advertisement systems of FIGS. 3A and 3B, which include both the ticket distribution portion and the advertisement portion, can operate on the Internet or other wide area network, which may be a less expensive alternative and save a large amount of money for the ticket distribution systems or state lottery systems. Additional security measures in this case may be added to prevent unauthorized access into the ticket distribution system (e.g., lottery system) via the Internet.

FIG. 3A shows an embodiment of an advertisement system 80, which includes a ticket/advertisement managing system 82, a plurality of ticket printing devices 84, and a plurality of user devices 86, interconnected by way of a network 88. The network 88 may include the Internet and may also include local or other wide area networks. In this embodiment, the ticket/advertisement managing system 82 communicates with the ticket printing devices 84 via the network 88. The ticket/advertisement managing system 82 in this embodiment may be configured to perform the ticket distribution functions and perform the advertisement functions as described in the present disclosure.

In some embodiments, the ticket/advertisement managing system 82 may be configured to communicate with the user devices 86 in a limited capacity. The user devices 86 may be used as mentioned above to create or plan an advertisement strategy. The user devices 86 may access the ticket/advertisement managing system 82 to perform the advertisement functions.

Information regarding the advertisement strategies that are created by the ticket/advertisement managing system 82 is configured to combine the advertisements, according to the advertisement strategies, with the ticket information (e.g., lottery numbers). The advertisement information and ticket information may be stored on separate databases or in the same database. The ticket/advertisement managing system 82 instructs the respective ticket printing devices 84 that when a ticket is to be printed, it is printed with the combination of a selected advertisement and ticket information on the ticket. The ticket/advertisement managing system 82 may also provide information about printed advertisements to the specific user devices 86 to inform the respective advertisers or agents associated with advertisers of the results of the advertisement strategies.

FIG. 3B is a block diagram of another advertisement system 100, which is similar to FIG. 3A. In this embodiment, however, the ticket managing server 102 and advertisement managing system 104 are individually configured as separate components on the network 88. In this way, it may be easier to separate the ticket distribution functions from the advertisement functions. Also, the ticket managing server 102 may be specifically configured to limit or restrict access by the user devices 86.

According to additional embodiments with respect to the present disclosure, the embodiments of FIGS. 2A-2D, 3A, and 3B may further include means for issuing mobile tickets, such as mobile lottery tickets or other types of mobile tickets. For example, in place of the ticket printing devices 34 and 84, a transmitter or wireless communication device may be employed using any suitable wireless protocol. The wireless communication device in this case may be configured to conduct the sale of virtual tickets to users of mobile devices (e.g., mobile phones, smart phones, tablets, laptop computers, or other mobile devices) and receive a fee for the sale of the virtual ticket. In some instances, the exact location or general location of a purchaser may be determined by GPS or other positioning protocols.

In addition to ticket information that might normally be displayed on a display screen of the mobile device, the virtual tickets may also include an area for an advertisement. Therefore, when the ticket information is displayed, the advertisement may also be displayed on the same screen whenever the virtual ticket is shown. In some embodiments, the advertisement may be displayed on the screen independently of the display of the ticket information. For example, the advertisement may be flashed on the screen when the virtual ticket is first purchased or may be displayed at random or predetermined times after purchase.

Advertisements using the mobile device may allow the particular establishment to offer a unique advertisement to mobile device users. For example, in a restaurant environment, if a customer purchases a ticket (e.g., virtual lottery ticket), the same restaurant may utilize the advertisement systems of the present disclosure to send an ad to the customer while the customer is still on the premises. The advertisement in this case may include an instruction for the customer to "Call your waitress to find out about getting a dessert for half off" or some other type of message.

In addition to using mobile devices for receiving a virtual ticket, mobile devices may also be used in place of the user device 42, 86. Thus, the mobile device can communicated with the advertisement portion of the advertisement systems of FIGS. 2 and 3. Particularly, a user may wish to access the advertisement managing system 40, 104 via the network 44, 88 using the mobile device. In this example, the network 44, 88 may be configured to include cellular communication, Wi-Fi, or other wireless protocols. In this respect, the user may be enabled to create an advertisement and advertisement strategy using a smart phone or other mobile device. Using the mobile device, a user can also edit an advertisement, turn on an advertisement, turn off an advertisement using the user's own discretion.

Figure 4:
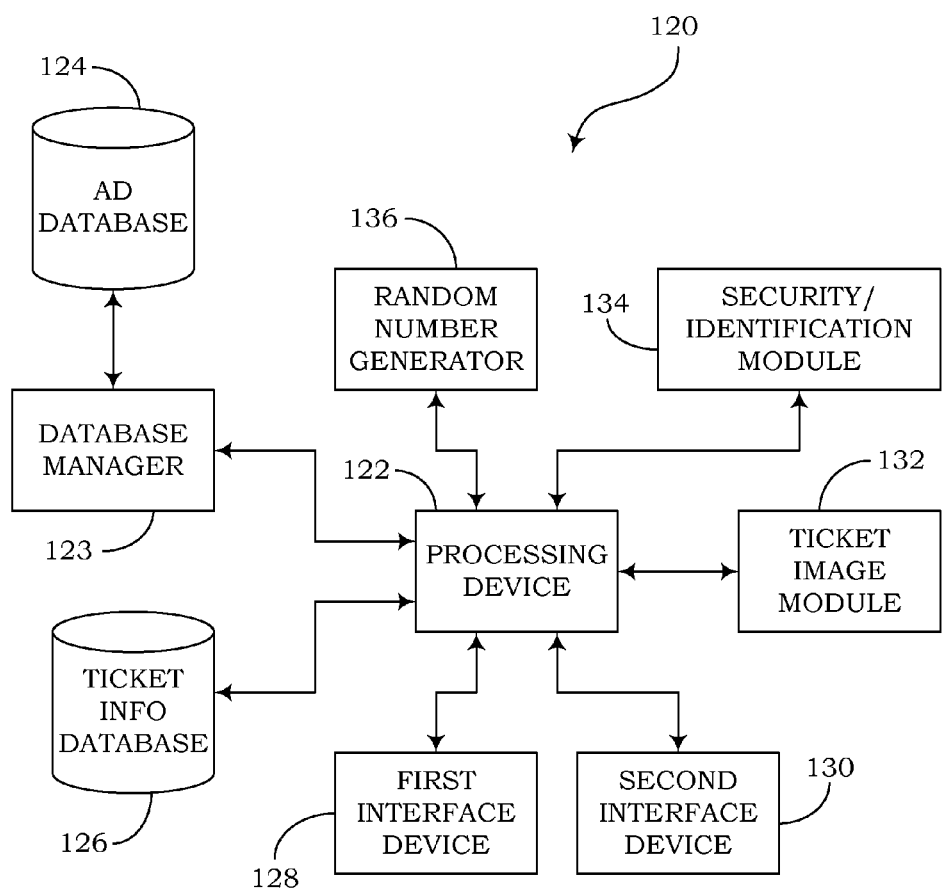
FIG. 4 is a block diagram of a lottery server according to various implementations of the present disclosure.

FIG. 4 is a block diagram illustrating an embodiment of a ticket managing server 120. According to some embodiments, the ticket managing server 120 may represent the ticket managing server 32 shown in FIG. 2A, 2C, or 2D, or the ticket managing server 102 shown in FIG. 3B. Also, the ticket managing server 120 may represent all or parts of the ticket/advertisement managing system 52, 82 shown in FIG. 2B and FIG. 3A, respectively.

The ticket managing server 120 may be configured to manage and organize ticket systems in which a number of tickets may be printed, even at multiple locations. The ticket managing server 120 may be used for the printing and/or distribution of various types of tickets, such as tickets for movies, sporting events, concerts, lotteries, metro train transit, bus transit, train transit, or other types. The ticket managing server 120 also controls a printing functionality that allows an advertisement to be printed on the ticket along with the normal ticket information.

Also, according to some embodiments, the ticket managing server 120 may be a lottery server for managing the operations of a lottery system, such as a state-run lottery system. However, according to various implementations of the present disclosure, the ticket managing server 120 may also include additional components that allow the ticket managing server 120 to not only manage lottery functionality, but also to allow advertisements to be printed on lottery tickets.

The ticket managing server 120 may be configured to enable the printing of advertisements based on certain time and location specifications, which may be entered by a user, such as an advertiser or a person associated with an advertiser. The time and location specifications may be configured to control a time period when a particular advertisement is to be printed. The time period may include not only dates, but times of the day as well. For example, an advertiser may wish for an advertisement to be printed from 4:00 pm to 7:00 pm on one particular day. The location specifications designate particular printing locations where the tickets may be printed. For example, with respect to the printing of lottery tickets, lottery ticket printing devices may be housed in known stores, such as gas stations, convenience stores, grocery stores, restaurants, etc. In this way, the advertisers are able to control which locations are intended to print their advertisements.

As shown in FIG. 4, the ticket managing server 120 comprises a processing device 122, a database manager 123, an ad database 124, a ticket information database 126, a first interface device 128, a second interface device 130, a ticket image module 132, a security/identification module 134, and a random number generator 136. The processing device 122 may be configured to control the overall operations of the ticket managing server 120. The components of the ticket managing server 120 may be configured in a single computer or may be configured in multiple computer systems and interconnected by a suitable network or bus interface. The computer(s) may include one or more processing devices, such as general-purpose or specific purpose processors or microcontrollers for controlling the operations and functions of the ticket managing server 120.

The computer(s) may also include one or more memory devices, which may be configured as internally fixed storage units, removable storage units, and/or remotely accessible storage units, each including a tangible, non-transitory storage medium. The various storage units may include any combination of volatile memory (e.g., random access memory (RAM), dynamic RAM (DRAM), etc.) and non-volatile memory (e.g., read only memory (ROM), electrically erasable programmable ROM (EEPROM), flash memory, etc.). The storage units may be configured to store any combination of information, data, instructions, software code, etc.

In some embodiments, the components of the ticket managing server 120 may be implemented in hardware, software, firmware, or any combinations thereof. For example, portions of the ticket managing server 120 that are implemented in software or firmware may be stored on a non-transitory memory device, such as a computer-readable media device, and may be executable by a suitable instruction execution system, such as a processing device. The portions implemented in hardware may include discrete logic circuitry, an application specific integrated circuit (ASIC), a programmable gate array (PGA), a field programmable gate array (FPGA), or any combinations thereof.

The functions, operations, and/or programs executed by the ticket managing server 120 may comprise an ordered listing of executable instructions for implementing logical functions and can be embodied in any computer-readable medium for use by an instruction execution system or device, such as a computer-based system, processor-controlled system, etc. In the context of the present disclosure, a computer-readable medium can be any medium that can contain, store, communicate, propagate, or transport programs for execution by the instruction execution system or device. Examples of computer-readable medium may include electronic, magnetic, electromagnetic, optical, infrared, or other systems or devices.

In some embodiments, the database manager 123 and ad database 124 may be omitted from the ticket managing server 120 and may be incorporated in a remote device and accessed via the first interface device 128 or second interface device 130. The advertisements may be bundled by the advertisement managing system 40, 104 and transmitted to the ticket managing server 120. In this case, the ticket managing server 120 controls the functions of ensuring that advertisements are printed along with ticket information. Otherwise, if this control is delegated to the advertisement managing system 40, 104, or, in some embodiments, delegated to the ticket printing devices 34, 84, then the database manager 123 and the ad database 124 may be omitted. The advertisements can be retrieved by the processing device 122 as needed, either from the ad database 124 or from a remote database.

In some embodiments, the ad database 124 and ticket information database 126 may be combined into a single database. However, it may be preferable to keep the information related to the ticket system separate from the advertisements, particular since certain ticket information (e.g., lottery numbers) usually requires separation from the public. The ticket information database 126 may include ticket information such as lottery numbers printed on lottery tickets throughout a lottery system. The ticket information may also include the dates and times when the ticket information (e.g., lottery numbers) were printed and the location of the ticket printing device 34, 84 that printed the information.

The first interface device 128 and second interface device 130 may be combined into a single interface, according to some embodiments. For example, a single interface may suffice when the ticket managing server 120 is in communication with the network 88 shown in FIGS. 3A and 3B. When implemented as shown in FIG. 4, the interface devices may be configured to communicate over different networks. For example, the first interface device 128 may be configured to communicate with devices connected to a private network, such as the private network 36 shown in FIGS. 2A-2D, and the second interface device 130 may be configured to communicate with devices connected to another network, such as network 44 shown in FIGS. 2A-2D or network 88 shown in FIGS. 3A and 3B.

The second interface device 130 may be configured to receive the advertisement and/or advertisement strategies from the advertisement managing system 40, 104, the ad strategies created for advertisers representing advertisements and time/location information describing when and where the advertisements are intended to be printed. Also, the second interface device 130 may provide confirmation information back to the advertisement managing system 40, 104 confirming for the advertisers that the advertisements were printed. The confirmation information may include information regarding the advertisement printed and the time/date and location when and where the advertisements were printed.

The random number generator 136 is configured to randomly pick lottery numbers, particularly for a lottery system. For example, if a customer visits a location where a ticket printing device 34, 84 is placed and wishes to purchase a lottery ticket but does not wish to enter specific numbers, the numbers may be randomly generated either at the ticket printing device itself or at the ticket managing server 120. In this example, the ticket managing server 120 may be configured as a lottery server. Either way, the numbers eventually are communicated to the ticket managing server 120 and stored in the ticket information database 126 so that the ticket managing server 120 can verify if a winning ticket has been issued. If someone comes forward with an alleged winning ticket but the winning numbers do not match any ticket information communicated to the ticket managing server 120 and stored in the ticket information database 126, then it can be determined that the ticket may have been forged. Also, the security/identification module 134 may assist in verifying winning tickets. Referring again to the random number generator 136, when the ticket managing server 120 receives a request from a ticket printing device 34, 84 to provide random numbers for a particular lottery game, the processing device 122 can give the limitations of the random numbers (e.g., numbers from 1 to 40) to the random number generator 136 to obtain the lottery numbers to be printed on the lottery ticket at the ticket printing device 34, 84.

The ticket image module 132 shown in FIG. 4 may be configured to combine the ticket information (e.g., lottery numbers) with an advertisement selected from the ad database 124 or other data source. Regarding the example of the lottery system, the lottery numbers may be obtained randomly from the random number generator 136, obtained randomly from a random number generator at the ticket printing device 34, 84, or obtained from numbers entered manually at the ticket printing device 34, 84. The processing device 122 may be configured to select an advertisement from the ad database 124 based on several factors. For example, the advertisements may be stored along with specific printing criteria for defining that advertisements are to be printed at only certain ticket printing devices 34, 84. When a ticket image is to be combined by the ticket image module 132, an advertisement, which is associated with the particular ticket printing device 34, 84 where the ticket information is to be printed, is selected. Also, certain time parameters are stored as well. These parameters indicate when the advertisements are to be printed. As an example, an advertiser may create an advertisement with instructions to print the ad only at a certain location (e.g., a ticket printing device located at a Speedway gas station in Buford, Ga.) between the hours of 2 pm and 7 pm on Friday Oct. 5, 2012. If at least these criteria are met, this particular advertisement is combined with the ticket information (e.g., lottery numbers) in a particular fashion (as described below).

If more than one advertisement is scheduled to be printed at a certain location at a certain time, other criteria may be analyzed by the processing device 122 to determine which advertisement is actually selected. For example, the selection may be based on how many more times an advertisement is to be printed, how much an advertiser is paying for each advertisement, how close the current time is to an end time parameter for an advertisement, and/or other algorithms or parameters.

In some embodiments, the ticket managing server 120 may be configured to create a place holder on a ticket where an advertisement is to be printed. The ticket information can be printed in other sections of the ticket, but the place holder is reserved for only the advertisement. This allows tickets to be printed in advance and then an advertisement can be printed in a particular section of the ticket (i.e., where the place holder is located) to complete the printing process. Parameters may be set to designate where an ad will go and then it is retrieved from the ad database 124 or other source to be printed.

The advertisement managing system 40, 104 may be configured to create advertisement strategies for advertisers, where each advertisement strategy includes an advertisement, a time period when the advertisement is to be printed, and one or more locations where the advertisement is to be printed. The ticket managing server 120 may be configured to receive the advertisement strategies in bundles to be distributed to multiple ticket printing devices 34, 84. The ticket managing server 120 may then control the distribution to the printing devices based on the criteria in the advertisement strategies. This information may also be transmitted in bundles to the individual ticket printing devices 34, 84 or distributed one at a time when needed. When bundled, the advertisements to be run at a certain time or on a certain day may be transmitted to the ticket printing device 34, 84, which will then store the advertisements and print them during the designated times. For example, if ads are to run at a particular location from 6:00 to 7:00 pm, the ads may be transmitted to the ticket printing device 34, 84 at 5:00 pm. The way in which the advertisements are transmitted to the ticket printing device 34, 84 may be different from the way that the advertisements are transmitted from the advertisement managing system 40, 104 to the ticket managing server 120.

The security/identification module 134 is configured to analyze the advertisement strategies, both when they are received from the advertisement managing system 40, 104 and before they are transmitted to the ticket printing devices 34, 84. If it is determined that an ad is corrupted, the security/identification module 134 may inform the processing device 122 about the corruption to filter out the ad and prevent the ad from being sent to the printing device. Also, when corrupted, the processing device 122 may be configured to retrieve a default or replacement ad from the ad database 124. The default or replacement ad may be an advertisement from a major advertiser (e.g., Coca-Cola). Corruption may be detected by the security/identification module 134 if it is determined that the identity of a file contains improper or unauthorized elements that do not match certain codes, format, or protocols. For example, the components of the advertisement systems 30, 50, 60, 70, 80, and 100 may have synchronized coding/decoding elements, encryption/decryption elements, etc. to allow proper security throughout the system. Other format information may also be common throughout the system, such as the size and shape of an advertisement or place holder, the resolution (dots per inch) of the advertisement, and other factors. Also, the security/identification module 134 as with other security modules throughout the system may check the identity of the components that sent the advertisements and/or advertisement strategies. For example, the identity may be checked by analyzing the MAC address, IP address, or other computer/device identification codes of the device that provided the data. Security throughout the system may also be checked by running algorithms that are coordinated with each authorized device.

Figure 5:
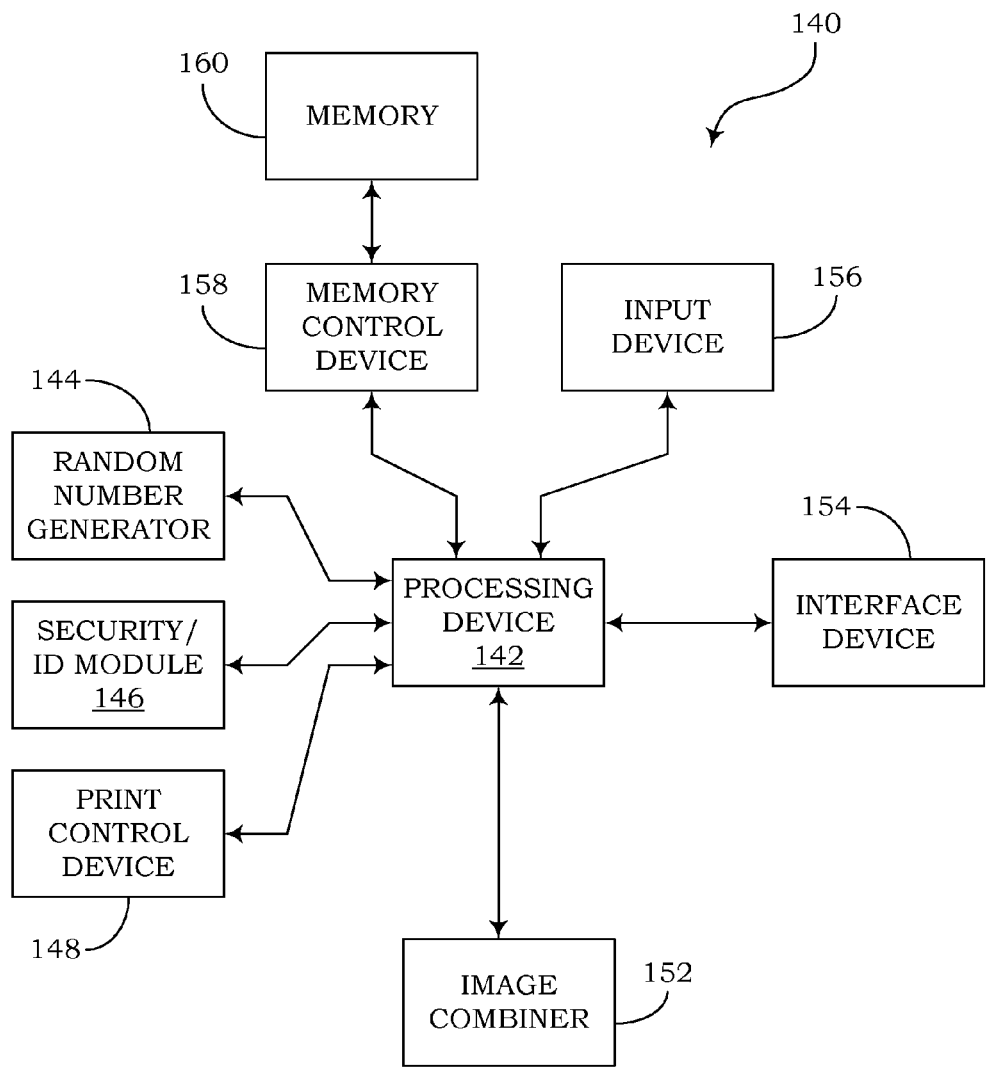
FIG. 5 is a block diagram of a ticket printing device according to various implementations of the present disclosure.

FIG. 5 is a block diagram illustrating an embodiment of a ticket printing device 140. The ticket printing device 140 may represent the ticket printing device 34 shown in FIGS. 2A-2D and/or the ticket printing device 84 shown in FIGS. 3A and 3B. As illustrated in the embodiment of FIG. 5, the ticket printing device 140 comprises a processing device 142, a random number generator 144, a security/identification module 146, a print control device 148, an image combiner 152, an interface device 154, an input device 156, a memory control device 158, and a memory 160. The ticket printing device 140 may be a computer terminal, a simple printer, or some intermediate type device, depending, for example, on the vendor, state, etc. According to various implementations, some components may be omitted and/or incorporated in other devices, such as in the ticket managing servers or advertisement managing systems. For example, the random number generator 144, image combiner 152, memory control device 158, and memory 160 may be omitted in some embodiments, perhaps depending on the particular type that the ticket printing device 140 is and the features that it might have.

As mentioned above with respect to the ticket managing server 120, the ticket printing device 140 may comprise a random number generator 144. However, according to alternative embodiments, the random number generator 144 may be omitted and random numbers may be obtained at the ticket managing server 120 instead. The processing device 142 may be configured to control how the limitations of the numbers that are randomly generated by the random number generator 144 are obtained. For example, if the customer wishes to play a Pick 4 lottery game that involves picking four numbers ranging from one to ten, then the processing device 142 may request the random number generator 144 to pick four numbers ranging from one to ten. If random numbers are generated remotely, the numbers may be communicated to the ticket printing device 140 via the interface device 154.

If the customer wishes to choose his/her own numbers instead of having a machine randomly pick them, the customer's numbers can be entered using the input device 156. The input device 156 may be a keypad, keyboard, or other type of entry device allowing numbers to be entered manually. Also, the input device 156 may include a scanner that is configured to scan papers or cards having the customer's numbers shaded in, punched out, marked up, or indicated in some other way.

The security/identification module 146 may include the same features at the security/identification module 134 as mentioned above with respect to FIG. 4. This module 146 may check to make sure advertisement information is legitimate as it is received and before it is printed.

As described in the present disclosure, the ticket printing device 140 not only prints a ticket (e.g., a lottery ticket or other type of ticket), but also is configured to print an advertisement on the ticket as well. A feature of the ticket printing device 140 is that the advertisement to be printed is not a single advertisement that is printed on all tickets, but may be an advertisement selected from among a plurality of advertisements. Also, the times when the advertisements are to be printed can be specified to allow an advertiser to control a very specific time frame when the advertisements are printed. Also, the actual location of the ticket printing device 140 (e.g., within a specific store at a specific address) can also be selected by the advertiser such that advertisements are only printed at locations where the advertiser chooses (e.g., only at stores within a five mile radius from the advertiser's establishment).

Advertisements may be stored remotely from the ticket printing device 140 according to some embodiments. In this case, the advertisement may be selected according to specific time and location parameters and transmitted to the ticket printing device 140. If the ticket information (e.g., lottery numbers) and selected advertisement are not already combined into a single image, the ticket printing device 140 may be configured to combine the images using the image combiner 152. The image combiner 152 prints the ticket information (e.g., lottery information) on one section of the ticket and prints the advertisement information on another section of the ticket. In some embodiments, the printing of the two sections may be done in one printing session. Alternatively, one section may be printed at an earlier time and the other section may be printed later to complete the printing process. Also, it may be preferable that the two sections of the ticket (representing the ticket information in one section and the advertisement information in another section) are separated from each other. However, in other embodiments, the sections may overlap to some degree. The ticket printing device 140 may follow any of various printing implementations for printing the two sections, as shown in more detail in FIGS. 6A-6H.

As mentioned above, advertisements may be stored remotely, such as in a database associated with the ticket managing server 120 and/or advertisement managing system 40, 104. In this case, the advertisements may be provided to the ticket printing device 140 one by one as needed (e.g., when a ticket is to be printed). According to some embodiments, the advertisements may be bundled together and transmitted to the ticket printing device 140 via the interface device 154. The bundled advertisements may be stored in memory 160. Then, when an advertisement is to be printed, the memory control device 158 is configured to run an algorithm to select an advertisement that is to be printed. The memory control device 158 selects the advertisement from memory 160 and supplies the ad to the image combiner 152, where the advertisement is combined with the ticket information.

The memory 160 may also store a default image that may be printed if there are no advertisements that meet the selection criteria of the memory control device 158. For example, a default image may include a simple text image informing potential advertisers that they may "Advertise Your Business Here" or other message. The default image may also include contact information, such as a phone number, web address, or other information to allow a potential advertiser to enter an advertisement to be printed with tickets as described herein. Another type of default ad may include an advertisement for a low cost and/or high volume advertiser (e.g., Coca-Cola™). The memory 160 may also store a separator image, such as a line, dashed line, dotted line, etc. that separates the first section having the ticket information from the second section having the advertisement information. The separator may also include text, such as "cut here" or other message indicating the separateness of each portion of the ticket. In this way, if the advertisement is a coupon that may be redeemed at a certain establishment, the ticket can be cut or ripped along the separator line and the coupon can be used without also handing over the ticket, which may include lottery numbers for an upcoming lottery or other useful ticket information to provide other privileges to its holder.

The print control device 148 may include printing heads, ink jets, paper dispensing devices, or other printer mechanisms for printing onto paper or other paper-based material. In some embodiments, the print control device 148 may also include other features for cutting off a ticket if the ticket is printed from a roll of paper, thus allowing the ticket to be completely severed from the roll. The print control device 148 may also be configured, according to various implementations, to create perforations along the separator line that separates the ticket information section from the advertisement information section. Thus, with perforations formed in the ticket, the ticket may be easily ripped into two separate pieces, where one piece can be handed to an advertiser to redeem a coupon, for instance, and the other piece can be kept to enjoy the benefits of the ticket privileges. The print control device 148 can also provide half-cuts for easy detachment. Also, the print control device 148 may also be configured to print on both the front and back of the paper or card. For example, in some embodiments, the ticket information may be printed on one side of the ticket and the advertisement may be printed on the other side. Also, the print control device 148 may be configured to receive ticket that already have preprinted ticket information on the ticket with a place holder for an advertisement, such that the print control device 148 only prints the advertisement. In other embodiments, the ticket information and advertisement are printed at the same time.

If the processing device 142 is configured to receive advertisement information immediately before printing and determines from the interface device 154 that the network is busy, unavailable, or has some other issue, then a default or replacement ad may be retrieved from memory 160 and printed. After an advertisement is printed, the interface device 154 is configured to send confirmation information about the advertisement that was printed and the time/date when it was printed. This information may be stored in memory 160 and sent as a group on a schedule basis (e.g., once a day, once a week, etc.). The information is sent to the advertisement managing system 40, 104 either directly or via the ticket managing server 32. Regarding lottery embodiments, the interface device 154 also communicates lottery numbers to the ticket managing server 32.

As described in the present disclosure, the ticket printing device 140 may comprise means for retrieving an advertisement from memory, such as the memory control device 158. The ticket printing device 140 also includes means for receiving ticket information, which may include any one or more of the input device 156, random number generator 144, and interface device 154. The ticket printing device 140 also includes means (e.g., print control device 148) for printing the ticket information and advertisement on a single ticket. The ticket information, for example, includes information that entitles a bearer of the ticket to one or more privileges.

The ticket printing device 140 may further comprise the memory device 160 configured to store one or more advertisements. The means for retrieving the advertisement may comprise an interface (e.g., interface device 154) configured to retrieve the advertisement from a remote database (e.g., ad database 124).

The ticket printing device 140 may be configured such that the single ticket that is printed is a lottery ticket. The ticket printing device 140 may therefore further comprise a random number generator configured to generate a plurality of lottery numbers to be printed on the lottery ticket.

The means for printing (e.g., print control device 148) may be configured to print the single ticket with a ticket section separated from an advertisement section. The ticket section may include at least the ticket information and the advertisement section may include at least the advertisement. The ticket section may be printed above the advertisement section on the ticket. The advertisement section may be oriented at an angle with respect to the ticket section (FIG. 6F). The advertisement section may be printed with at least one of a quick response (QR) code 182 (FIG. 6B) and a barcode 192 (FIG. 6C). The ticket printing device 140 may further comprise means for creating a perforation (e.g., print control device 148) separating the ticket section from the advertisement section. The means for printing (e.g., print control device 148) may also be configured to print at least the ticket information on one side of the ticket and print the advertisement on the other side of the ticket.

FIGS. 6A through 6H illustrate many embodiments of lottery tickets that may be printed. As illustrated, the lottery ticket may also include an advertisement. It should be noted that certain features of each of the embodiments shown in FIGS. 6A-6H may be combined in any suitable variety of ways. Also, the features involving printing an advertisement on a ticket may also be applied to printing ads on other types of tickets as well, such as movie tickets, bus tickets, concert tickets, etc. In addition to the embodiments shown in FIG. 6, the ticket may also be printed such that ticket information is printed on one side of the ticket and an advertisement is printed on the other side.

Figure 6A:
FIGS. 6A through 6H are diagrams of exemplary lottery tickets printed with advertisements, according to various implementations of the present disclosure.

FIG. 6A shows an image of a lottery ticket 170 having a ticket information section 172 and an advertisement section 174. In this embodiment, the ticket information section 172 is located at the top of the lottery ticket 170 and the advertisement section 174 is located at the bottom of the lottery ticket 170. The ticket information section 172, when the ticket pertains to a lottery, includes lottery information, such as the state (if applicable) holding the lottery, which in this example is the state of Georgia. The lottery information in the ticket information section 172 may also include the specific lottery game (e.g., Pick 4), when the drawing is to be held (e.g., Saturday, Oct. 13, 2012), the date the ticket was purchased, (e.g., Oct. 12, 2012 at 2:50 pm), the lottery numbers (e.g., 1, 8, 3, and 4), and a bar code that may include security information and/or identification information. The lottery information may include at least this information or may include less information or more information depending on the factors that may be controlled by the state, the specific lottery game, or other factors. When the ticket is related to other types of tickets, the ticket information, of course, will include other elements.

The advertisement section 174 of the lottery ticket 170 may include a name of the business being advertised (e.g., Big Bob's Pizza), contact information for the business (e.g., "Next to Gwinnett Place Mall 770-555-1212"), advertising text (e.g., a coupon offering that states, "Buy One Large Pizza, Get a Second One Free"), and expiration date (e.g., "expires Oct. 20, 2012"), and an image. In this example, the image is a slice of pizza. However, additional or other images may include logos associated with the business or other suitable images.

Figure 6B:
Figure 6C:

FIGS. 6B and 6C are other examples of lottery tickets 180 and 190, respectively. In FIG. 6B, the lottery ticket 180 includes a quick response (QR) code 182, allowing a customer to obtain additional information about the advertiser and/or advertisement. In FIG. 6C, the lottery ticket 190 includes a second code (i.e., a barcode 192), which may be associated with the particular business. FIG. 6C also shows an instruction (e.g., "Cut Here"), which may be added on or near a separator line separating the ticket information section from the advertisement section.

Figure 6D:

FIG. 6D shows an embodiment of a lottery ticket 200 having a perforation 202. In some embodiments, the perforation 202 may be formed in the ticket, such as at the location of the separator line to allow the ticket to be cleanly ripped into two respective pieces. Thus, if the advertisement (i.e., coupon) is used to get the free second pizza at Big Bob's Pizza, the lottery numbers do not have to be forfeited to Big Bob as well.

Figure 6E:
Figure 6F:

FIG. 6E shows another embodiment of a lottery ticket 210 wherein an advertisement section 212 is located at the top of the ticket and a ticket information section 214 is located at the bottom of the ticket. In other embodiments, the locations of the advertisement section 212 and ticket information section 214 may be located at any portion of the lottery ticket 210 and may even overlap in some cases.

FIG. 6F shows another embodiment of another lottery ticket 220. In this embodiment, a ticket information section 222 is oriented in a normal manner, but an advertisement section 224 is oriented at an angle (e.g., rotated 90 degrees counterclockwise). In other embodiments, the two sections 222 and 224 may be oriented at any angle with respect to the entire ticket 220 and/or at any angle with respect to each other.

Figure 6G:

FIG. 6G shows another embodiment of a lottery ticket 230. In this embodiment, a ticket information section 232 is printed is a similar manner as described above. However, an advertisement section 234 may be configured to display a default ad. For example, the default ad in this example may include a message (or advertisement) explaining or directing potential advertisers to an advertisement managing system, which may be associated with the advertisement managing system 40, 104 shown in FIGS. 2-3. The default ad may include "Advertise Your Business Here" or other type of message for communicating the concept of placing an advertisement onto a lottery ticket. This message may be more common during an initial stage of an advertisement providing strategy when new advertisers are trying to be reached. The default ad may also include contact information, such as a website address, phone number, or other information. The website address may be configured to enable a user or advertiser to create an account with an advertising company and create specific advertisement strategies. The advertisement strategies may include the actual advertisement that is displayed on a ticket, such as the images and text displayed in the advertisement sections shown in FIGS. 6A-6H. The advertisement strategies may also include specific time and location information for allowing the advertisers to pick certain time periods when the advertisements are to be printed and to pick certain locations where the advertisements are to be printed. The locations may include a nationwide campaign, statewide campaign, or other definable areas, even allowing an advertiser to specifically identify individual locations where ticket printing devices are placed (e.g., specific gas stations), which may be near the business being advertised.

Figure 6H:

FIG. 6H is another embodiment of a lottery ticket 240. In this embodiment, the lottery ticket 240 is configured to have a greater size than a regular lottery ticket to accommodate the additional advertisement information. In this way, more information may be printed onto a ticket, such as additional text (i.e., "As everyone knows: Big Bob's is the Best!").

Printing Advertisements on Other Media

According to other examples, advertisements may also be printed on various types of media, such as paper, cardstock, cardboard, plastic, Styrofoam, metal, or other suitable media. In particular, the implementations disclosed herein may include printing an ad on an item associated with a purchase. For example, these items on which the ads are printed may be items used for delivering a purchased product to a customer or items used by the customer when consuming the purchased product. The items on which the ads are printed may also be disposable items. In some embodiments, ads may be printed on items associated with a purchase, such as those used in fast food restaurants, coffee shops, grocery stores, and other stores serving food, drinks, desserts, etc. For example, the ad-bearing items may include beverage cups, napkins, sandwich/burger wrappers, French fry containers, paper placemats, tray liners, paper take-out bags, paper grocery bags, pizza boxes, flyers glued to pizza boxes, stickers or flyers applied to various disposable products, coffee/hot-beverage cups, heat-insulating sleeves used on coffee cups, etc. In this respect, the advertising systems may be in communication with fast food restaurants or other food or beverage stores to enable an advertiser to advertise at specific locations. The advertisements are thereby provided to customers making a food or beverage purchase at a known location and time. Because of the time and location aspects of the advertisement systems of the present application, the advertisements can be strategically provided to customers according to predetermined advertisement arrangements. Also, new advertising campaigns can be quickly implemented due to sudden changes or newly discovered needs.

Using the implementations described in the present disclosure, an advertiser can create one or more advertisement strategies using a process involving online systems, as described above. The advertisements can then be distributed to printing devices in food or beverage service facilities to be printed for individuals who wish to purchase food and/or beverages. The advertisement can be printed in a designated spot on the item associated with a purchase, such as on a disposable item, and may include a predetermined size or shape, depending on the particular item being advertised on. As mentioned above, advertisers can choose where the advertisements are to be printed. Therefore, the advertisements can be distributed to people who might live or work in a specific area (e.g., near the fast food or beverage store). Further, advertisement campaigns can be tailored to fit within an individual community where the ads will appear. Printing devices located within the stores may include location information to specifically identify the location of the store.

Figure 7:
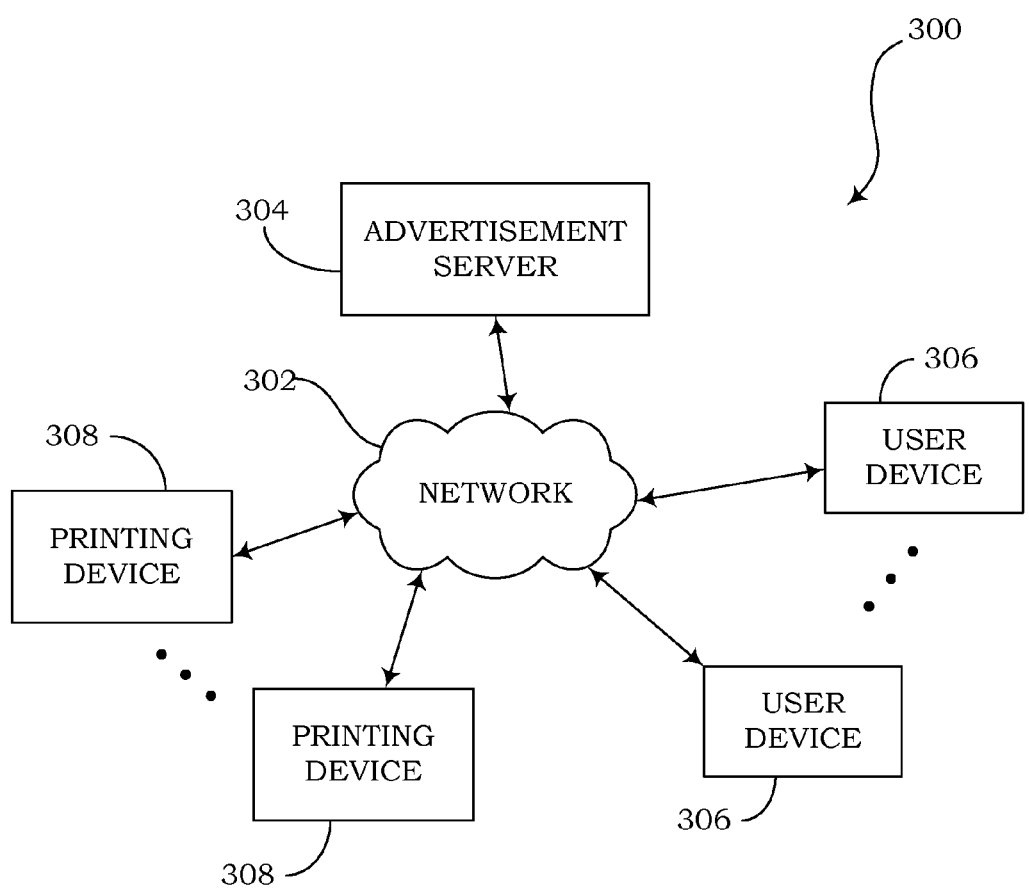
FIG. 7 is a block diagram showing another advertisement system according to various implementations of the present disclosure.

FIG. 7 is a block diagram illustrating an embodiment of an advertisement system 300 according to various implementations of the present disclosure. The advertisement system 300 of FIG. 7 includes a network 302 configured to enable communication among a number of electronic components. The network 302 may include a wide area network, such as the Internet, a local area network, and/or other suitable types of networks. The advertisement system 300 also includes an advertisement server 304 configured to enable advertisers to create and/or upload advertisements, select day and time information to specify when they want the advertisements printed, and select location information to specify where they want the advertisements printed. The entry of location, day, and time information may be similar to the embodiments described above.

The user devices 306 of the advertisement system 300 may include remote computing devices (e.g., computers, laptops, mobile devices, etc.) that allow a user to enter specific advertisement information. The user devices 306 communicate with the advertisement server 304 to create/upload advertisements and select time, date, and location information. The selected locations correspond to specific locations (e.g., fast food restaurants, grocery stores, coffee shops, etc.) where printing devices 308 may be placed. Therefore, one or more advertisements sent to the printing devices 308 from the advertisement server 304 via the network 302 are intended for the particular store or restaurant where that printing device 308 is located. A worker at that facility can then use the printed advertisement that is printed on a particular item (e.g., disposable container or other suitable medium) associated with a particular purchase. That item may then be used for its typical purpose, such as for holding, containing, or wrapping foods and/or beverages or serving some other purpose associated with the fast food and/or beverage industry.

The advertisement system 300 of FIG. 7 may include security measures that are incorporated throughout the respective system. Thus, when an advertisement is created, security elements are added. Also, when advertisements are distributed to the printing devices 308, the security elements can be verified to ensure that the advertisements are authentic. Furthermore, when an advertisement is printed, the printing devices 308 may also be configured to check the security elements. The security elements may include encoding/decoding protocols, encryption/decryption protocols, or other protocols known to the advertisement server 304 and printing devices 308. In some embodiments, the components of the advertisement system 300 may utilize code characters, passwords, or other codes that are configured to change in a certain way. For example, a code number may increase by a certain value on a regular basis (e.g., every day). Also, the components of the systems may be configured to use and check for certain advertisement characteristics to ensure security. For example, these advertisement characteristics may include a specific size of an image of the advertisement, a specific type of file, a file naming convention, a specific number of dots per inch (dpi) for the advertisements, or other characteristics.

Not only can the advertisement system 300 of FIG. 7 be used for advertisements, but it can also be used for promoting or announcing local events, promoting brand affinity with local organizations (e.g., local sports teams), promoting special events (e.g., sporting events, fairs, festivals, etc.), and raising money for charity. The advertisement system 300 allows advertisers to easily target specific areas. Also, advertisers can run advertisements at specific times, depending on local events or other occurrences that may have a limited duration (e.g., a fair or circus in a local area, etc.).

As opposed to a system that prints advertisements in bulk for one advertiser, the advertisement system 300 of the present disclosure enables multiple advertisers to advertise as many advertisements as they wish and have the advertisements targeted at only certain locations. In this regard, the present disclosure provides a variable system that can select from among a plurality of advertisements, depending on various parameters. Also, the advertisements can be printed on a medium that can be easily viewed by a consumer, particularly during a time when the consumer is eating or drinking. During this time, a consumer's attention is normally directed to their food and/or beverage, thereby giving the consumer many opportunities to see the item on which the advertisement is printed and making the advertisement more effective.

The advertisement server 304 is also configured to enable an advertiser to create an advertisement strategy or advertisement campaign, as mentioned above. An advertiser can create advertisement strategies by entering information regarding the actual advertisement content, one or more locations where the advertisement is to be printed and used, one or more days, times of the days, the types of items on which the advertisements are printed, and other factors.

The printing devices 308 may also be configured to communicate with the advertisement server 304 to provide information about the details of the advertisements that were printed. Thus, the printing devices 308 provide verification that the advertisements were printed as scheduled. The verification information may include information regarding which advertisements were printed, the location where the advertisements were printed, the time and date when the advertisements were printed, the item on which the advertisements were printed, the time when the printed item was given to a customer, and other relevant information.

Communication between the advertisement server 304 and printing devices 308 may be limited to specific times of the day or specific days of the week, depending on various implementation. Communication involves providing advertisements to the printing devices 308 with instructions for printing. Communication also involves providing confirmation back to the advertisement server 304 of the printing of advertisements.

The advertisement server 304 shown in FIG. 7 may be configured similarly to the ticket managing server 120 of FIG. 4. Also, the printing devices 308 shown in FIG. 7 may be configured similarly to the ticket printing device 140 of FIG. 5. However, instead of being configured for printing on tickets, the advertisement server 304 and printing devices 308 are configured to print on other types of media as discussed above. The details of the advertisement server 304 and printing devices 308 are therefore omitted here for the sake of brevity.

Therefore, according to some implementations, an advertising system may comprise an advertisement server configured to manage the printing of advertisements at a plurality of predetermined locations and at a plurality of predetermined times. The advertising system may comprise a plurality of printing devices operating at the plurality of predetermined locations, each printing device configured to print advertisements on items associated with purchases at various stores, restaurants, or shops. A network may be configured to enable communication between the advertisement server and the plurality of printing devices. Thus, the printing devices are configured to print the advertisements according to the plurality of predetermined times based on when at least one advertiser intends for the advertisements to be printed.

The advertisements may be printed at the time of purchase or printed in advance. Also, the advertisements may be printed individually or in bulk. An example of preprinting in bulk might include a situation where a fast food restaurant preprints placemats intended for use for that week, day, or hour. This would allow the advertisers to still choose a location and a time window for the ad placement while allowing the restaurant to prepare the placemats ahead of time to ensure there is no delay during a rush.

Displaying Advertisements on Electronic Devices

In some embodiments, the advertisement system 300 may further include means for issuing mobile advertisements, such as advertisements on cellular phones, smart phones, or other mobile devices. The advertisements may be supplied to a mobile device based on a GPS location of the consumer, the consumer's purchases, or other factors. The advertisement may be sent via a prerecorded phone message, a text message, or other communication. Advertisements sent to a mobile device may allow the particular establishment to offer a unique advertisement to mobile device users. For example, a fast food restaurant may offer a customer on the premises a special deal on desserts.

Figure 8:
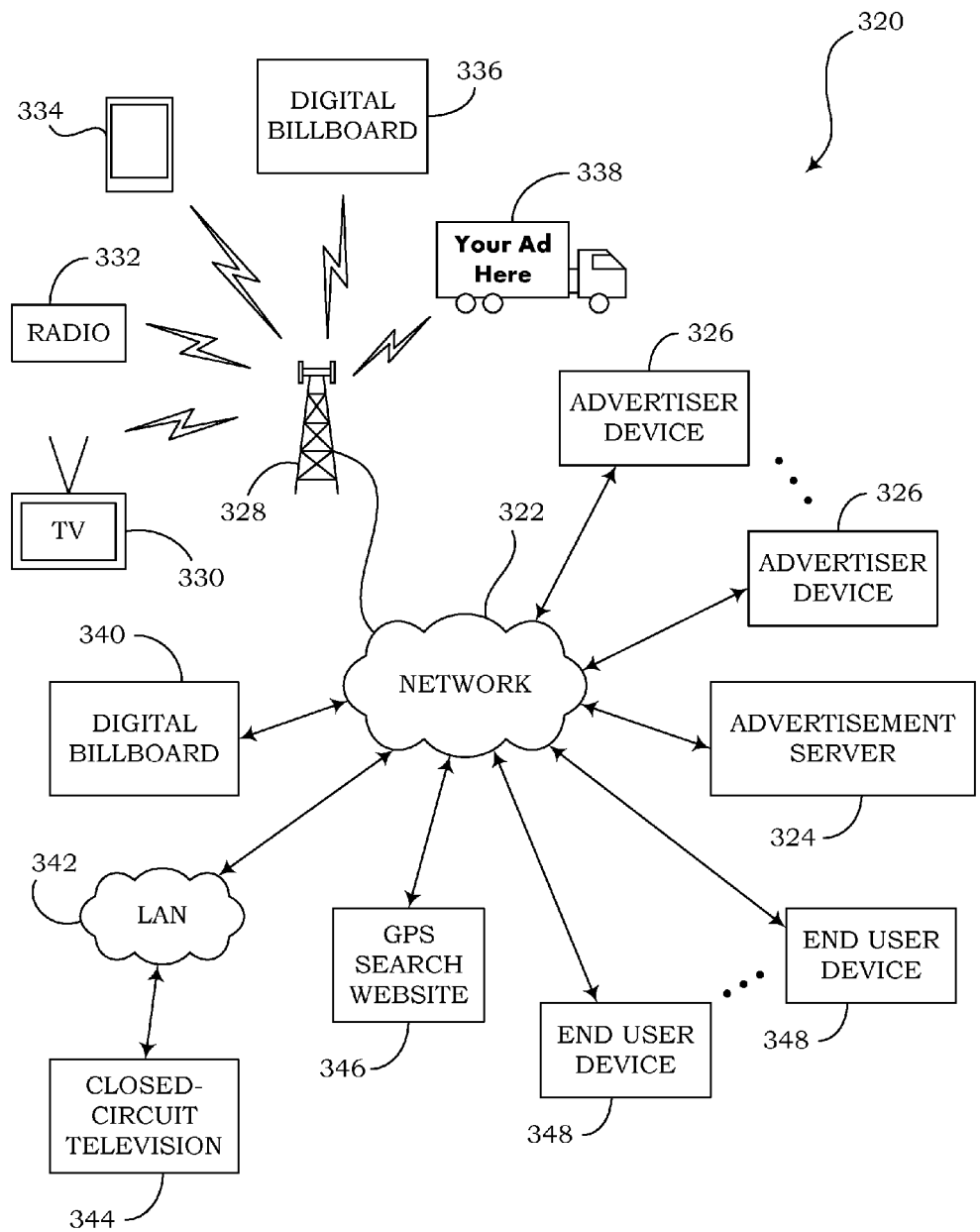
FIG. 8 is a block diagram showing yet another advertisement system according to various implementations of the present disclosure.

FIG. 8 is a block diagram illustrating another embodiment of an advertisement system 320. In this embodiment, the advertisement system 320 includes, among other things, one or more networks 322, an advertisement server 324, and one or more advertiser devices 326, which are similar to the public networks, servers, and user devices described above with respect to other embodiments. An advertiser can create and/or upload one or more advertisements to the advertisement server 324 from the advertiser device 326 and create advertisement campaigns. However, instead of advertisements being printed on tickets or on other media, as described above, the advertisement system 320 of FIG. 8 presents advertisements in visual and/or audible form on one or more digital devices.

The advertisement system 320 may include one or more antennas 328. The antennas 328 may be in the form of antenna towers, cellular towers, broadcast television towers, radio towers, and may be associated with other suitable broadcasting antennas, towers, satellites, and other equipment for wirelessly broadcasting signals to remote locations. For example, the antennas 328 may broadcast advertisements to televisions 330, radios 332, mobile devices 334, and other wireless signal receiving devices.

The antennas 328 may also include proprietary communication equipment for wirelessly communicating to specific advertising devices. For example, the antennas 328 may communicate with digital billboards 336 to provide advertisements to be displayed on the digital billboards 336.

The antennas 328 can also wirelessly communicate advertisement information to an advertising vehicle 338. The advertising vehicle 338 may be a truck, van, automobile, or other vehicle. The advertising vehicle 338 includes a digital display device, which may be mounted to a side panel or back panel of the vehicle. In this respect, advertisements may be presented to and observed by other drivers or passengers in the vicinity of the advertising vehicle 338. In some embodiments, the advertising vehicle 338 may include a GPS device for determining the location of the vehicle. The location information can be communicated to the advertisement server 324, which may select specific advertisement(s) based on the vehicles location. If the vehicle travels over a long distance, the displayed advertisement may be changed, depending on whether the advertisements are targeted to customers in particular areas.

For instance, a truck travelling from New York to Miami may have a digital billboard display that changes along the way. The advertisements can be updated automatically based on the particular location and the proximity to different cities. Ads displayed on the truck's digital billboard display can also be automatically changed based on highway exits. For instance, when the truck passes one exit, the advertisements can be changed to advertise for restaurants, gas stations, local sites, or other businesses that may be near an upcoming exit. The updated ads can then show nearby drivers at least some options for restaurants or gas stations at upcoming exits. In this embodiment, the advertising portal of the present disclosure may further be configured to allow an advertiser to enter not only location information, but also directional information with respect to the travelling advertisement vehicle. For example, an advertiser may wish to advertise for a gas station at a specific exit (e.g., exit 45) when the truck or other travelling advertisement vehicle is travelling on a certain highway in a certain direction (e.g., travelling south on I-95) when the truck is approaching the specific exit (e.g., between exit 45 and exit 55).

The one or more networks 322 may include any number of networks for communication over various protocols. For example, at least one network 322, such as the Internet, may include TCP/IP communications, including electrical and fiber cable communications and/or wireless communication. Also, the one or more networks 322 may include telephone lines, cellular phone transmission antennas, satellites, and/or other phone communication equipment, which may operate in conjunction with the antennas 328.

The advertisement system 320 also includes digital billboards 340 which include wired communication with the network 322. The digital billboards 336 and 340 may be similar to each other except for the manner in which they receive the advertisement information (i.e., via wireless transmission or wired communication).

The network 322 may be connected to other networks, such local area networks (LANs) 342. The LANs 342 may include one or more closed-circuit televisions 344 or other type of closed-circuit display devices. In this respect, a control device operating on the LAN 342 may be configured to receive advertisement information from the advertisement server 324 via the network 322 and LAN 342 and forward the advertisement information to the closed-circuit televisions 344 as directed. The LANs 342 and closed-circuit televisions 344 may be located in many different areas, such as airports, bus stations, train stations, stadiums, auditoriums, banks, restaurants, amusement parks, or other areas.

In some embodiments, a GPS search website 346 may be associated with the advertisement server 324. The advertisement server 324 may be configured to determine when an end user requests a specific search for a location provided by the GPS search website 346. When such a search is conducted, the advertisement server 324 is configured to provide advertisement information to the GPS search website 346, which then combines the search results with advertisements specifically directed to advertisers in the vicinity of the specific GPS search results. In addition, the GPS search website 346 may also provide advertisement information specifically directed to advertisers located in between the user's location and a search destination or along a path that a user may travel from a start location to a destination location.

The advertisement system 320 of FIG. 8 may also include communication of advertisement to specific end user devices 348. For example, end user devices 348, such as computers, laptops, mobile devices, smart phones, or other devices may be used to stream video and/or audio from online websites. These services may include video on demand, audio on demand, online entertainment channels, Internet television programs, Internet radio programs, and others. Based on specific selections by the user of the end user device 348, the advertisement server 324 combines advertisement information to the end user device 348 for presentation along with the requested video and audio.

The advertisement server 324 and advertiser devices 326 of the advertisement system 320 of FIG. 8 may include many of the same features described above with respect to other servers and user devices associated with other embodiments. The advertisement system 320 may also include security measures that are incorporated throughout the system. Security elements of the advertisement system 320 may include various protocols as mentioned above, which may be utilized by some or all of the components of the advertisement system 320.

Since electronic devices, which are capable of presenting advertisements, seem to be ubiquitous, the advertisement server 324 may include a database that stores the locations of the devices and/or may include a search function for electronically searching for the devices. When the locations of multiple electronic devices are known, an advertiser can select the electronic devices on which to advertise. For example, an advertiser may wish to advertise on a national level, a statewide level, a county level, a city level, a neighborhood level, a school district level, a street level, or even a single location (e.g., store, shop, house, etc.). If multiple electronic devices are located at a single location, an advertiser can even select one or more of the electronic devices at that location. This selection process allows the advertisers to specifically target the electronic devices on which to advertise.

Therefore, according to some implementations, an advertising system may comprise a plurality of electronic devices and an advertisement server configured to manage the display of a plurality of advertisements on the plurality of electronic devices. At least one network may be configured to enable communication between the advertisement server and the plurality of electronic devices. The electronic devices may be configured to display the plurality of advertisements according to predetermined time parameters when at least one advertiser intends for the advertisements to be printed.

Three-Dimensional Printing and Etching

The systems of the present disclosure may also be used in systems that are configured for three-dimensional printing, etching (e.g., laser etching, chemical etching, etc.), and other various forms of graphical creation. Three-dimensional printing and etching may be executed at predetermined locations where appropriate three-dimensional printers and/or etching equipment are housed. For example, a fast food restaurant may have three-dimensional printing and/or etching equipment for creating and/or modifying a small token or toy that is given to customers. With such equipment on location, the restaurant is able to provide customized advertisements or other type of printing (e.g., etching a customer's name) on the token or toy. The customized object can include advertisement information on any surface of the object.

The three-dimensional printers and/or etching equipment may be substituted for the printing devices or digital devices described above with respect to the other embodiments. The process of creation/uploading advertisements may be similar to the above-described embodiments, except that the advertisements to be printed three-dimensionally and/or etched onto a surface may include additional information regarding spatial features, depths of etching layers, colors, etc. Three-dimensional ads may also take the form of a projection or display, such as a holographic image or 3D video, which can be shown in a 3D projector, a 3D headset, or other 3D displaying system.

In some embodiments, objects on which advertisements are printed or etched may be treated by the application of light, energy, chemicals, heat, or other resource. Advertisements may become visible by adding material to the objects or removing material.

Therefore, according to some implementations, an advertising system may comprise an advertisement server configured to manage the creation of advertisements at a plurality of locations and at a plurality of times. The advertising system may also comprise a plurality of printing/etching devices operating in the plurality of predetermined locations, each printing/etching device being configured to print or etch advertisements onto three-dimensional objects. A network may be configured to enable communication between the advertisement server and the plurality of printing/etching devices. The printing/etching devices may be configured to print or etch the advertisements at the plurality of times according to when at least one advertiser intends for the advertisements to be printed.

Conditional Advertising

The advertisement servers described above may also be configured to enable an advertiser to select or create advertisements that are printed or presented when certain conditions are met. For example, conditional advertising may be established beforehand to allow advertising to be based on real-time events. For example, an advertiser may wish to advertise for ice cream when the temperature in a particular area is extremely hot. Or an advertiser may wish to advertise for flashlights, batteries, and other emergency supplies if a severe storm is expected to hit a certain area. Or an advertiser may wish to draw customers away from heavy traffic areas to locations of stores that are more lightly traveled. Also, special deals may be offered if certain products are not selling as expected.

Therefore, conditional advertising can be based on any number of measures, such as temperature, current weather conditions, weather forecasts, traffic conditions, current events, local events, upcoming events, supply/demand figures, and other factors. The conditional events may be based on a simple yes/no condition (e.g., a school day or not a school day) or may be based on the degree of a certain factor (e.g., more than 4 inches of snow in the forecast). Any number of conditions may be selected ahead of time for defining the particular times or conditions when an advertiser wishes to print or display the advertisements.

Also, the advertising servers may be configured to adjust the pricing of advertisements based on one or more of the conditions. For example, if a town has a special event that attracts a large number of people to the town, the cost for advertising may be increased since the demand may be greater.

Conditional advertising may also be based on factors regarding competing advertisers. For example, the advertisement servers may honor advertisers based on a first-come, first-serve basis. Alternatively, the advertisement servers may utilize an advertisement selection based on the highest bidder for a particular advertisement space or timeslot.

Ordering Multiple Types of Ads from Multiple Vendors

The present disclosure further describes systems for ordering, creating, and distributing multiple types of advertisements across a variety of advertisement mediums from a variety of advertisement providers. An advertiser can order the delivery of an advertisement to be printed or displayed at one or more specific locations at one or more specific times. The boundaries of the specific location(s) as well as the boundaries of the time window(s) can be predetermined or set by the advertiser. Examples of locations include, but are not limited to, ads to be displayed at one specific location, within a certain distance (e.g., a one-mile, five-mile, or ten-mile radius) from a location, or within the borders of a country, state, city, county, or other jurisdiction. Examples of times include, but are not limited to, a certain time or time period on a certain day, within multiple times or time periods of a certain day or days, within a set of hours on a certain day, within certain hours each weekday, within a certain year, month, week, or day, continuing from an immediate time until the end of a certain time or condition, or other times. Further, locations can represent the site, sites, building, buildings, complex, or other structures of a business or other pre-defined static locations. Also, the locations can represent one or more moving locations (e.g., a vehicle, mobile phone, etc.) that can be determinable by GPS or other means.

Ad types can be audio, audio/visual, a single image, a moving image, an image on a ticket, on a toy, on a food wrapper or cup, on a digital billboard, on a digital display in public, on a digital display on a mobile device, on a display at a mall, or other types of advertisements. Ads can be printed in one or more sections and placed on a traditional billboard. Ads can be displayed on a traditional television, Internet TV, traditional radio, or Internet radio. Ads can also be presented as 3D projections at a certain location, such as at a shopping mall, theater, restaurant, home, etc. Ads can also be projected/displayed within a 3D headset or display, such as within a virtual reality system. Ads can be interactive ads that a viewer can interact with.

In some embodiments, the advertisement managing system 40, 104, advertisement server 304, 324, or other system or device for managing or controlling the ordering, creating, and/or distribution of advertisement may utilize one or more portal devices, websites, or other suitable control devices. The portal devices may be associated with one or more ad sellers who sell multiple types of ads through the portal device. An ad buyer may be anyone from an individual person to a multinational company may use the one or more portal devices for designing, ordering, managing, and paying for ads and ad campaigns. The portals may also be used to analyze the success of one or more ads. The analysis of the success of the ads may be determined based on targeted vs. mass marketing, location information, time information, etc.

The advertisement portals/websites may be configured to enable advertisers to create and/or upload their own ads. Advertisers can create campaigns where they order certain ads in certain areas at certain times. The ad orders may be conditional as mentioned above. In some embodiments, advertisers may use advertising agents and/or agencies in various markets for various types of ads. Further, advertisers may have various entities within their corporate structure that have control over certain ads or ad campaigns, such as an international office, national office, regional office, local office, etc.

The advertisement portals, according to some embodiments, may allow for the option of multiple interactive hierarchal accounts. For instance, an ad agency may have numerous accounts for their various clients. The clients may have multiple accounts with multiple ad agencies, perhaps where each ad agency may specialize in advertising in various parts of the world and in various types of advertisements or advertisement mediums. The clients may also comprise various levels within their own corporate structure that may be international, national, regional, local, etc. While there may be multiple ad providers, multiple ad agencies, and multiple corporate entities, the portal or portals of the present disclosure can provide a common way for ordering, creating, organizing, distributing, and tracking ads across all the providers and agencies in a manner that can be customized and organized to fit the needs of the various users.

The advertisement arrangement may be arranged such that various levels or hierarchies will have the option to give or restrict certain rights. For instance, one ad agency may give a client full rights to order ads, while another may put restrictions on some clients, such as a spending limit. One company may give a local branch only the rights to place ads locally etc. The advertising portals may allow these rights and permissions can go in both directions. The advertising portals can be used to control the various rules, restrictions, limits, etc. on the various entities. Thus, an ad agency can utilize the advertising portals to limit the spending of the client, or the client can utilize the advertising portals to limit the spending of the agency.

Variable Determinable Content Printing

According to some embodiments of the present disclosure, systems may be configured for printing "variable determinable content" at a point of sale (POS) terminal. Variable determinable content may refer to determining certain additional information that may be printed based on purchases made at the POS terminal. One example of this is where a customer may place a special order at a fast food restaurant, such as a burger with extra cheese. The systems of the present disclosure may be configured to make various calculations, such as calculating the change in calories of the burger. The systems may also print a list of ingredients, calorie and nutrition information, and other information based on the changes in the special order. Such systems may also include the same or similar security and delivery options as mentioned above for the advertisement systems.

It should be understood that the routines, steps, processes, or operations described herein may represent any module or code sequence that can be implemented in software or firmware. In this regard, these modules and code sequences can include commands or instructions for executing the specific logical routines, steps, processes, or operations within physical components. It should further be understood that two or more of the routines, steps, processes, and/or operations described herein may be executed substantially simultaneously or in a different order than explicitly described, as would be understood by one of ordinary skill in the art.

The implementations described herein represent a number of possible implementations and examples and are not intended to necessarily limit the present disclosure to any specific implementations. Instead, various modifications can be made to these implementations as would be understood by one of ordinary skill in the art. Any such modifications are intended to be included within the spirit and scope of the present disclosure and protected by the following claims.

I claim:

1. An advertising system comprising:
   an advertisement server configured to manage the printing of advertisements at a plurality of predetermined locations and at a plurality of predetermined times, each of the predetermined locations being associated with a food/beverage serving facility;
   a plurality of printing devices operating at the plurality of predetermined locations, each printing device configured to print an advertisement on a service item, wherein the principle construction of each service item is specifically related to an action of serving food or beverage products to a customer at the food/beverage serving facility; and
   a network configured to enable communication between the advertisement server and the plurality of printing devices;
   wherein the printing devices are configured to print the advertisements according to the plurality of predetermined times based on when at least one advertiser intends for the advertisements to be printed;
   wherein the service item is one of a soda cup, a coffee/hot-beverage cup, an insulating sleeve used with a coffee/hot-beverage cup, a sandwich/burger wrapper, a French fry container, a paper placemat, a tray liner, and a restaurant take-out bag; and
   wherein each advertisement is printed on the service item at the food/beverage serving facility on the day that the service item is used to serve food/beverage to the customer.

2. The advertising system of claim 1, further comprising a plurality of user devices, each user device enabling an advertiser to interact online with the advertisement server to perform at least one of the operations of creating an advertisement and uploading a previously-created advertisement.

3. The advertising system of claim 2, wherein the advertisement server is configured to enable the advertiser to select specific hours of specific days when an advertisement is to be printed.

4. The advertising system of claim 2, wherein the advertisement server is configured to enable the advertiser to select one or more of the plurality of predetermined locations where an advertisement is to be printed.

5. The advertising system of claim 4, wherein the advertisement server is configured to enable the advertiser to select locations based on a distance of the locations from one or more stores associated with the advertiser.

6. The advertising system of claim 1, wherein the advertisement server is configured to manage the printing of the advertisements according to specific conditions associated with at least one of temperature, current weather conditions, weather forecasts, news stories, political events, and current events.

7. The advertising system of claim 1, wherein the advertisement server and plurality of printing devices include means for ensuring security and authentic identification of the advertisements.

8. The advertising system of claim 1, wherein the advertisement server comprises a database for storing the advertisements, the database further configured to store information regarding one or more locations where the advertisements are to be printed and to store information regarding the times when the advertisements are to be printed.

9. The advertising system of claim 8, wherein the advertisement server is configured to bundle a plurality of advertisements into an ad bundle and transmit the ad bundle to a specific printing device before the times when the advertisements are to be printed.

10. The advertising system of claim 1, wherein each of the printing devices is further configured to print nutritional information on the respective service item, the nutritional information including nutrition facts, caloric values, and/or ingredients of the respective food or beverage product served to the customer.

11. The advertising system of claim 10, wherein each printing device is configured to print newly-calculated nutritional information based on changes in the nutritional information due to special orders of the food or beverage products.

12. An advertising system comprising:
   an advertisement server configured to manage the creation of a plurality of advertisements to be printed or etched at a plurality of locations and at a plurality of times;
   a plurality of printing/etching devices operating in the plurality of locations, each of the plurality of printing/etching devices configured to print or etch one of the plurality of advertisements onto at least one of a plurality of three-dimensional objects; and
   a network configured to enable communication between the advertisement server and the plurality of printing/etching devices;
   wherein the printing/etching devices are configured to print or etch the advertisements at the plurality of times according to when at least one advertiser intends for the advertisements to be printed or etched;
   wherein each of the three-dimensional objects onto which the advertisements are printed or etched is an item associated with a food or beverage purchase; and
   wherein each of the plurality of locations is associated with a food/beverage serving facility.

13. The advertising system of claim 12, wherein at least one of the plurality of three-dimensional objects is a restaurant toy or token, and wherein the advertisements are printed or etched on the three-dimensional objects at the plurality of locations immediately before they are given to customers.

14. The advertising system of claim 12, further comprising a plurality of user devices, each user device enabling online interaction with the advertisement server to perform at least one of the operations of creating an advertisement and uploading a previously-created advertisement;

wherein the advertisement server is configured to enable the selection of specific hours of specific days when an advertisement is to be printed or etched;

wherein the advertisement server is configured to enable the selection of one or more of the plurality of locations where an advertisement is to be printed or etched, the selected locations based on at least one of a nationwide scale, statewide scale, citywide scale, countywide scale, zip-code scale, and a distance of the locations from one or more advertiser stores.

15. The advertising system of claim 12, wherein the advertisement server and plurality of printing/etching devices include means for ensuring security and authentic identification of the advertisements.

16. The advertising system of claim 12, wherein the advertisement server comprises a database for storing the advertisements, the database further configured to store information regarding the plurality of locations where the advertisements are to be printed or etched and to store information regarding the plurality of times when the advertisements are intended to be printed or etched.

17. The advertising system of claim 12, wherein each of the three-dimensional objects onto which the advertisements are printed or etched is an item associated with a purchase at a point-of-sale (POS) device.

18. An advertising system comprising:
a plurality of electronic devices;
an advertisement server configured to manage the display of a plurality of advertisements on the plurality of electronic devices; and
at least one network configured to enable communication between the advertisement server and the plurality of electronic devices;
wherein each of the plurality of electronic devices is configured to display at least one of the plurality of advertisements according to predetermined time parameters when at least one advertiser intends for the advertisements to be displayed; and
wherein each of the plurality of electronic devices is one of a digital billboard and a closed-circuit television.

19. The advertising system of claim 18, wherein the at least one network further includes at least one transmission device for wirelessly broadcasting the plurality of advertisements, and wherein each of the plurality of electronic devices includes a remote device configured to receive and display at least one of the plurality of broadcast advertisements.

20. The advertising system of claim 19, wherein at least one remote device is a display device mounted in or on a vehicle for electronically displaying the at least one of the plurality of broadcast advertisements.

21. The advertising system of claim 20, wherein the display device mounted in or on the vehicle is configured to display a first advertisement based on a first location of the vehicle and to display a second advertisement based on a second location of the vehicle.

22. The advertising system of claim 18, further comprising a plurality of user devices, each user device enabling an advertiser to interact online with the advertisement server to perform at least one of the operations of creating an advertisement and uploading a previously-created advertisement.

23. The advertising system of claim 22, wherein the advertisement server is configured to enable the advertiser to select specific hours of specific days when an advertisement is to be displayed, and wherein the advertisement server is configured to enable the advertiser to select at least one location where an advertisement is to be displayed when at least one of the electronic devices is in the at least one location.

24. The advertising system of claim 18, wherein each of the plurality of electronic devices is one of an outdoor digital billboard, an indoor digital billboard, an outdoor closed-circuit television, an indoor closed-circuit television, a digital display on a vehicle, a digital display at a bus stop, train station, airport, or transportation hub, a digital display at a mall or hospital, a video display, a device for displaying GPS search results, a device for playing video and/or audio on demand, and/or an audio/video display.

25. The advertising system of claim 18, wherein the advertisement server is configured to manage the displaying of the advertisements according to specific conditions associated with at least one of temperature, current weather conditions, weather forecasts, news stories, political events, and current events.

26. The advertising system of claim 18, wherein the advertisement server and plurality of electronic devices include means for ensuring security and authentic identification of the advertisements.

* * * * *